United States Patent
Summer et al.

[11] Patent Number: 5,886,818
[45] Date of Patent: Mar. 23, 1999

[54] MULTI-IMAGE COMPOSITING

[75] Inventors: Susan Kasen Summer, Warren, Conn.; Steve A. Welck, Maui, Hi.; Burkhard Katz, Overath, Germany; Jon M. Dickinson; Pierre C. Van Rysselberghe, both of Portland, Oreg.

[73] Assignee: Dimensional Media Associates, New York, N.Y.

[21] Appl. No.: 333,497

[22] Filed: Nov. 2, 1994

(Under 37 CFR 1.47)

Related U.S. Application Data

[63] Continuation-in-part of Ser. No. 183,278, Jan. 14, 1994, abandoned, which is a continuation-in-part of Ser. No. 985,592, Dec. 3, 1992, Pat. No. 5,311,357.

[51] Int. Cl.$^6$ .......................... G02B 27/22; G03B 21/00; G03B 21/28
[52] U.S. Cl. ......................... 359/478; 359/479; 359/462; 353/10; 353/98
[58] Field of Search ...................................... 359/478, 479, 359/365, 129; 353/10, 98, 99; 345/158

[56] References Cited

U.S. PATENT DOCUMENTS

| | | |
|---|---|---|
| 922,722 | 5/1909 | Sallé . |
| 995,607 | 6/1911 | Kempinski . |
| 1,044,715 | 11/1912 | Wearn . |

(List continued on next page.)

FOREIGN PATENT DOCUMENTS

| | | |
|---|---|---|
| 6362285 | 4/1993 | Australia . |
| 0309630 | 4/1989 | European Pat. Off. . |
| 0310721 | 4/1989 | European Pat. Off. . |
| 0363206 | 4/1990 | European Pat. Off. . |
| 0460873A1 | 12/1991 | European Pat. Off. . |
| 747917 | 3/1944 | Germany . |
| 1154711 | 9/1963 | Germany . |
| 5545262 | 3/1980 | Japan . |
| 679342A5 | 1/1992 | Switzerland . |
| 1321303 | 6/1973 | United Kingdom . |
| 1 543 616 | 4/1979 | United Kingdom . |
| 2062281 | 5/1981 | United Kingdom . |
| 2072874 | 10/1981 | United Kingdom . |
| 2131645 | 6/1984 | United Kingdom . |
| 2134649 | 8/1984 | United Kingdom . |
| 2149090 | 6/1985 | United Kingdom . |
| 2177842 | 1/1987 | United Kingdom . |
| WO 83/03019 | 9/1983 | WIPO . |
| WO 89/09423 | 10/1989 | WIPO . |
| WO 90/05944 | 5/1990 | WIPO . |
| WO 93/12455 | 6/1993 | WIPO . |

OTHER PUBLICATIONS

*Three–Dimensional Imaging Techniques*, Okoshi, Takanori, University of Tokyo, Tokyo, Japan, pp. 148–149.

*Primary Examiner*—Cassandra Spyrou
*Assistant Examiner*—Audrey Chang
*Attorney, Agent, or Firm*—Kolisch, Hartwell, Dickinson, McCormack & Heuser

[57] ABSTRACT

Image compositing apparatus and methodology for the creation, in a defined volume of three-dimensional space, of a composite organization of plural images/visual phenomena, including at least one projected real image, displayed in formats including (a) front-to-rear, (b) side-by-side and (c) overlapping and intersecting, adjacency. The apparatus incorporates different unique arrangements of visual sources, and optical elements including concave reflectors, beam splitters and image-forming/image-transmissive scrim/screen structures. In one important modification of the system, which does not necessarily require compositing, a projected real image is derived from an image-producing data stream containing three-dimensional image cues selected from the group consisting of shading, occlusion, perspective, motion parallax, size vs. depth, light (chroma value) vs. depth and definition vs. depth. In a further important modification of the invention, a system is proposed which allows a viewer/user to interact directly with a projected real image, in a manner allowing the manipulation of one or more characteristics or aspects of the image.

10 Claims, 14 Drawing Sheets

U.S. PATENT DOCUMENTS

| | | |
|---|---|---|
| 1,699,689 | 1/1929 | Curry . |
| 2,112,314 | 3/1938 | Spandau . |
| 2,210,806 | 8/1940 | Etbauer . |
| 2,215,396 | 9/1940 | Hoyt . |
| 2,232,547 | 2/1941 | Mathias . |
| 2,285,509 | 6/1942 | Goshaw . |
| 2,576,147 | 11/1951 | Sauvage . |
| 2,628,533 | 2/1953 | Oetjen . |
| 2,679,188 | 5/1954 | Gould . |
| 2,975,415 | 3/1961 | Klasens . |
| 3,036,154 | 5/1962 | Harman . |
| 3,048,654 | 8/1962 | Schade, Sr. . |
| 3,096,389 | 7/1963 | Dudley . |
| 3,293,983 | 12/1966 | Gaudyn . |
| 3,317,206 | 5/1967 | Holt . |
| 3,572,893 | 3/1971 | Bennett et al. . |
| 3,632,108 | 1/1972 | Wilson . |
| 3,647,284 | 3/1972 | Elings et al. . |
| 3,661,385 | 5/1972 | Schneider . |
| 3,893,754 | 7/1975 | McInally . |
| 4,073,569 | 2/1978 | Rizzo . |
| 4,094,501 | 6/1978 | Burnett . |
| 4,164,823 | 8/1979 | Marsico . |
| 4,210,928 | 7/1980 | Ohmori et al. . |
| 4,229,761 | 10/1980 | Thomas . |
| 4,232,968 | 11/1980 | Kempf . |
| 4,239,342 | 12/1980 | Aurin et al. . |
| 4,281,353 | 7/1981 | Scarborough, Jr. . |
| 4,315,281 | 2/1982 | Fajans . |
| 4,322,743 | 3/1982 | Rickert . |
| 4,357,075 | 11/1982 | Hunter . |
| 4,443,058 | 4/1984 | Bosserman . |
| 4,491,872 | 1/1985 | Boldt et al. . |
| 4,509,837 | 4/1985 | Kassies . |
| 4,535,354 | 8/1985 | Rickert . |
| 4,550,978 | 11/1985 | Freidle . |
| 4,556,913 | 12/1985 | VanBreemen et al. . |
| 4,571,041 | 2/1986 | Gaudyn . |
| 4,623,223 | 11/1986 | Kempf . |
| 4,647,966 | 3/1987 | Phillips et al. . |
| 4,649,425 | 3/1987 | Pund . |
| 4,671,625 | 6/1987 | Noble . |
| 4,683,467 | 7/1987 | Macaulay et al. . |
| 4,692,878 | 9/1987 | Ciongoli . |
| 4,702,603 | 10/1987 | Augustyn . |
| 4,756,601 | 7/1988 | Schröder . |
| 4,776,118 | 10/1988 | Mizuno . |
| 4,802,750 | 2/1989 | Welck . |
| 4,805,895 | 2/1989 | Rogers . |
| 4,840,455 | 6/1989 | Kempf . |
| 4,927,238 | 5/1990 | Green et al. . |
| 4,971,312 | 11/1990 | Weinreich . |
| 4,988,981 | 1/1991 | Zimmerman et al. ............ 345/158 |
| 4,995,719 | 2/1991 | Shanks . |
| 5,004,331 | 4/1991 | Haseltine et al. . |
| 5,036,512 | 7/1991 | Cloonan et al. . |
| 5,065,116 | 11/1991 | Ueda et al. . |
| 5,114,226 | 5/1992 | Goodwin et al. . |
| 5,144,482 | 9/1992 | Gould . |
| 5,148,310 | 9/1992 | Batchko . |
| 5,172,266 | 12/1992 | Garcia et al. . |
| 5,187,597 | 2/1993 | Kato et al. . |
| 5,257,130 | 10/1993 | Monroe ................ 359/478 |
| 5,329,323 | 7/1994 | Biles ................ 359/478 |

MULTI-IMAGE COMPOSITING

REFERENCE TO RELATED APPLICATION, AND INCORPORATION BY REFERENCE OF OTHER MATERIALS

This application is a continuation-in-part of U.S. patent application Ser. No. 08/183,278, filed Jan. 14, 1994 now abandoned, which application is a continuation-in-part of Ser. No. 07/985,592 now U.S. Pat. No. 5,311,357, filed Dec. 3, 1992, by Susan Kasen Summer and Burkhard Katz for DEVICE FOR THE CREATION OF THREE-DIMENSIONAL IMAGES, which U.S. patent claims priority based upon three priority German patent applications, identified as P 42 04 821.4, filed Feb. 18, 1992 by Burkhard Katz, P 42 02 303.3, filed Jan. 28, 1992 by Burkhard Katz and Susan Kasen Summer, and P 42 28 451.1, filed Aug. 26, 1992 by Burkhard Katz. The entire contents (i.e., specification, claims and drawings) of the '357 U.S. patent, and of the three, just-identified German priority applications, are hereby incorporated by reference into this application. These three German priority applications form part of, and are contained in, the official file wrapper of the '357 patent. Also specifically incorporated herein by reference are the entire contents of U.S. Pat. No. 4,802,750 to Welck, entitled REAL IMAGE PROJECTION SYSTEM WITH TWO CURVED REFLECTORS OF PARABOLOID OF REVOLUTION SHAPE HAVING EACH VERTEX COINCIDENT WITH THE FOCAL POINT OF THE OTHER, and U.S. Pat. No. 5,257,130 to Monroe, entitled APPARATUS AND METHOD FOR CREATING A REAL IMAGE ILLUSION, and of Swiss Patent No. CH 679342 A5, entitled APPARATUS FOR PROJECTION OF OBJECTS.

BACKGROUND AND SUMMARY OF THE INVENTION

The present invention relates to apparatus and methodology for the compositing of multiple, viewable phenomena/sight-stimulators, such as multiple images and real objects, and in particular, to such apparatus and methodology which includes the incorporation into such compositing formation of at least one projected real image.

The power of visual imagery has fascinated and captured people for decades, and as new visual-imagery technology has emerged in recent years, the possibilities for presenting startling, dramatic visual phenomena have leapt onto the communicating landscape with powerful, attention-getting boldness. Long recognized, for example, have been the striking, attention-capturing power of motion pictures, of television, of three-dimensional graphics and displays, of magical floating-in-space images, and of others, and this attention-getting capability is widely recognized as a powerful tool in the creative communication "playing" fields of amusement, advertising, basic information conveyance, clarification of hard-to-otherwise-visualize phenomena and relationships, medical diagnostics, and many, many others.

In this setting, the present invention steps onto the "communication stage" with a highly innovative and advanced systemic apparatus and methodology that allows for the selective compositing, in a defined viewable volume of space, of wonderfully innovative multiple-layer, adjustably positionable composite images, including at least one three-dimensional real image, which advance opens important doors in all of the fields mentioned above (as well as many others) neither openable, nor even approachable with prior art technology.

Described hereinbelow, and illustrated in the plates of drawings which form part of this invention disclosure, are numerous key embodiments of the system and methodology of the invention, with all embodiments offering the core capability of compositing, in three-dimensional space, multiple images, including at least one real image, where any two images (or visual phenomena) are organized, at any given point in time, with at least one of formats (a) front-to-rear, (b) side-by-side and (c) overlapping and intersecting, adjacency. If desired, these formats may be combined in different ways. Each of these formats is, of course, taken with reference to the specific point of view of an observer. So, for example, the front-to-rear format may exist with respect to a viewer looking at the created composite imagery generally along a horizontal axis, as well as such a person viewing the composite imagery along a more upright axis. The imagery, or any component thereof may be moveable in the composite setting, either by virtue of the fact that the related source involves movement, or by virtue of the provision of moveable optical structure which plays a role in the creation of the composite whole.

A special feature of the present invention includes the cooperative relationship, for example, between: (a) a source of three-dimensional imagery (other than a real object source), which source includes a visual-image database itself containing "entrained" psychological optical cues that dramatically promote the perception of real three dimensionality; (b) a two-dimensional screen device, such as a video monitor, which forms from a data stream provided by this database a related image (moving or still) which contains the relevant three-dimensional cues; and (c) a real-image optical projection system that acquires such a screen-device-borne image and projects the same into space in a setting which is free of (unencumbered by) physiological impediments, such as a frame or a border, that might detract from the apparent, real, three-dimensionality of the projected real image.

Still another important feature of the invention described and claimed herein is the presence of an organization, in certain embodiments, of a system which allows a viewer/user to interact directly with a projected real image, in effect to manipulate one or more characteristics or aspects of the image. For example, and to illustrate this notion, one can imagine the projection into space of a real image of a piece of fruit, such as a pear, in a setting which permits the viewer/user to "grasp" the pear, and to rotate or otherwise move it, for example.

One of the extraordinary capabilities of the system of the present invention, as will be described and illustrated more fully hereinbelow, is that it is possible to composite, in essentially or approximately a single plane, slightly staggered/offset pixelated or rastered, images (and the like), as, for example, might be derived from a video source, in a manner resulting in a composite projected real image having greatly enhanced image resolution. In such an application, of course, the several sources which result in the end-result composite image would be drawn from precisely the same foundation image source material. In other words, were, for example, three video images composited in this fashion and to this end, the same image material would be occurring at the same moment of time on all of the three original video sources.

As will be apparent from a reading of the description which follows, along with a viewing of the respective, different drawing plates, each of the systems described herein has, as a part of what is referred to as viewing-enabling structure, one or more optical elements which are common to other disclosed systems, though each system specifically shown herein has, generally speaking, an optical arrangement or organization which is specifically different from the arrangements of the other systems. Also, and with respect to the illustrated and described systems, various sources (image-effecting, sight-stimulator-effecting) of ultimately viewable imagery, occupying suitable location stations, are common from one system to another, but somewhat differently arranged in order to cooperate appropriately with related optical elements (system optical structure). The different optical elements (arrangements) which are combined in the systems described are individually known and understood in the world of optics, and accordingly, great detail about the positioning, sizing and relative locating of these elements, which is well understood by those skilled in the art, is omitted from this text. The materials specifically incorporated into this document by reference above, taken together with the drawings and description herein, afford an abundant base of information for one of ordinary skill in the art fully to appreciate the respective operations of the several systems shown and discussed, as well as to understand the powerful potential for the core contribution of this invention in enabling the spatial compositing of multiple images as contemplated by the invention.

Further explaining something in general terms about the apparatus descriptions which are to follow, it will be immediately evident that the various optical elements and imagery sources in each disclosed system must be, and are, integrated interactively and operatively with one another so that their respective positions relative to one another result in the placement and compositing of images in a spatial station (visual staging station) which is easily viewable by an observer. In some instances, it will be immediately apparent from the drawing figures that the nature of this system integration structure takes the form of a cart or a housing or some other evident kind of framework but in certain other illustrations of systems, the details of specific system integration structure are omitted in favor of a bracket in the figure which is presented there specifically to symbolize the presence of such structure.

The various objects and important advantages sought for and offered by the apparatus and methodology of the present invention, alluded to above, will become apparent as the description which follows is read in conjunction with the accompanying drawings.

DESCRIPTION OF THE DRAWINGS

The several drawings which form part of this disclosure are schematic in nature, and are not presented herein with any precise scale, or exact dimensional relative interrelationship of components.

DETAILED DESCRIPTION OF THE INVENTION

Figure 1:
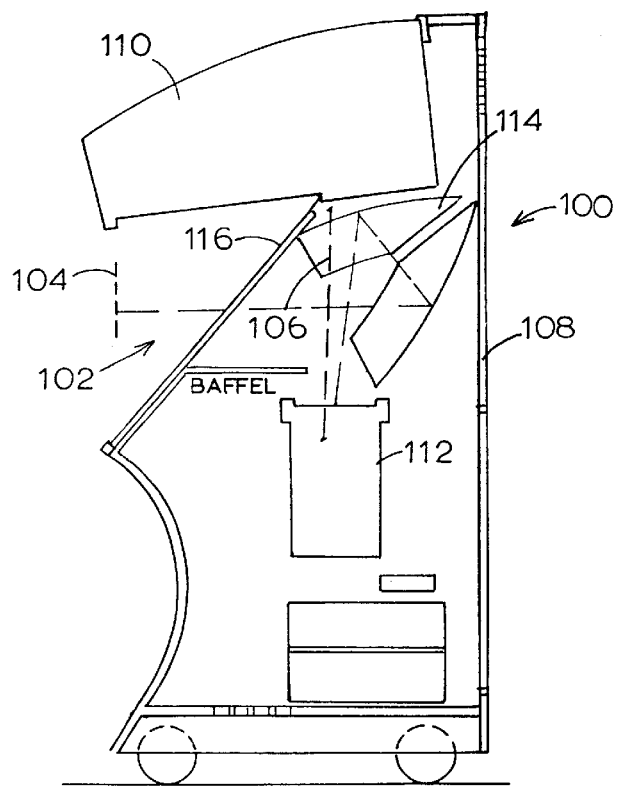
FIG. 1 is a schematic illustration of one embodiment of an image compositing system constructed in accordance with the present invention, with this embodiment including a dual-sector real image projector and a plano beam splitter, with two video sources, to create a composite image including a projected foreground real image and a background virtual image.

Turning attention now to the drawings, and referring first of all to FIG. 1, indicated generally at 100 is one form of visual display apparatus constructed in accordance with the invention. Apparatus 100 operates, as will be explained, to create, in a visual staging station shown generally at 102 which occupies a defined volume of viewable space, a composite organization of multiple viewable phenomena, and specifically here, a pair of images, including a real image 104 in the foreground and a virtual image 106 in the background. The point of view of an observer is laterally to the left of the apparatus illustrated in this figure.

This same terminology ("visual staging station", "defined volume of viewable space" and "composite organization of multiple viewable phenomena"), and general organization, characterize all of the other specific system embodiments which are shown in the other drawing figures. Accordingly, all of this terminology will not necessarily be repeated in the respective descriptions of the other drawing figures. Apparatus 100, as is true for the other system apparatus disclosed herein, is also referred to as a system for establishing viewability of sight stimulators, and further as a system for producing a composite organization of multiple images. Where the terms viewable phenomena and sight stimulators are used, it is intended that these phrases be understood to include real, three-dimensional objects as well as images. Where the term image is used, this is intended to include real images, screen-borne images (i.e., projection-based images as from a film projector, a slide projector, a video unit) and virtual images.

The key operative components which make up apparatus 100 are suitably fixed and contained within the frame 108 of a cart, which is also referred to herein as system integration structure.

Two sources of imagery are included in apparatus 100, and these are a large-screen, rear projection video unit 110 which faces nearly straight downwardly in FIG. 1, and another, smaller-screen video source 112 which faces upwardly in FIG. 1. Located intermediate these two sources are a dual-sector, parabolic, concave real image projector 114, and a plano, reflective beam splitter 116, positioned and oriented relative to one another, and to the two imagery sources, as illustrated in FIG. 1.

Projector 114 is constructed precisely in accordance with the teachings of the incorporated-by-reference Welck patent, and works exactly as is described in that patent. This projector includes two concave, optically confronting, cooperative, reflective surfaces which extend in space in a manner discontinuous from one another (i.e., their extensions intersect). While in many instances, it is preferable to use, as a real image projector, a structure based upon parabolic optics, such as the one shown in the structure of FIG. 1, other concave reflecting surface structures, such as spherical structures, elliptical structures, and others, may be used.

Beam splitter 116 is a reflectively coated sheet of glass (or the like) which allows light transmission through it.

With operation of the system shown in FIG. 1, projector 114 creates, from the screen of source 112, real image 104, and beam splitter 116 creates, from the image appearing on the screen of source 110, virtual image 106. From the point of view (mentioned above) of an observer, real image 104 resides in the foreground, and virtual image 106 in the background.

Figure 2:
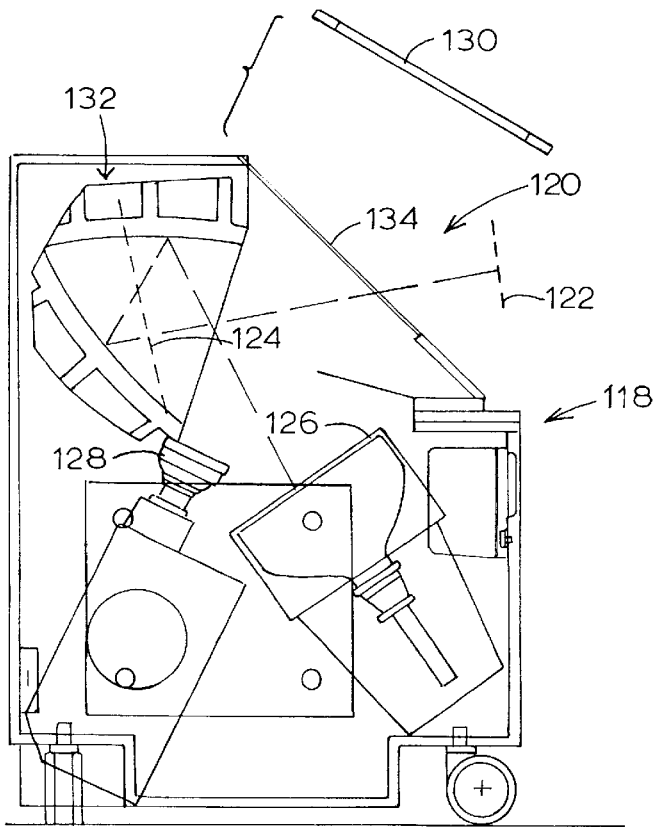
FIG. 2 is a schematic illustration of another embodiment of the invention employing a dual-sector real image projector and a plano beam splitter, along with a video source and a projected-onto-screen source, to create a composite image including a foreground projected real image and a background virtual image.

FIG. 2 shows at 118 another form of visual display apparatus constructed in accordance with the invention, with this system creating, in a viewing station 120 which is somewhat like previously mentioned viewing station 102, a composite of multiple images including a foreground real image 122 and a background virtual image 124.

Forming part of apparatus 118 are two imagery sources including a video source 126 and a projected image source including a projector 128 and an overhead screen 130. Also included in apparatus 118 are a dual-sector real image projector 132, which is like previously mentioned projector 114, and a plano beam splitter 134 which is like previously described beam splitter 116. Hereinafter, where reference is made to a dual-sector real image projector, and to a plano beam splitter, it should be understood that these respective structures have the same characteristics, respectively, as projectors 114, 132 and beam splitters 116, 134.

Light from projector 128 passes through beam splitter 134 to form an image on screen 130, and the image on this screen is reflected to the viewer via beam splitter 134 to create virtual image 124. The viewer's point of view in FIG. 2 is laterally to the right of the structure shown in this figure.

From the image which appears at the site of video source 126, projector 132 creates foreground real image 122.

Figure 3:
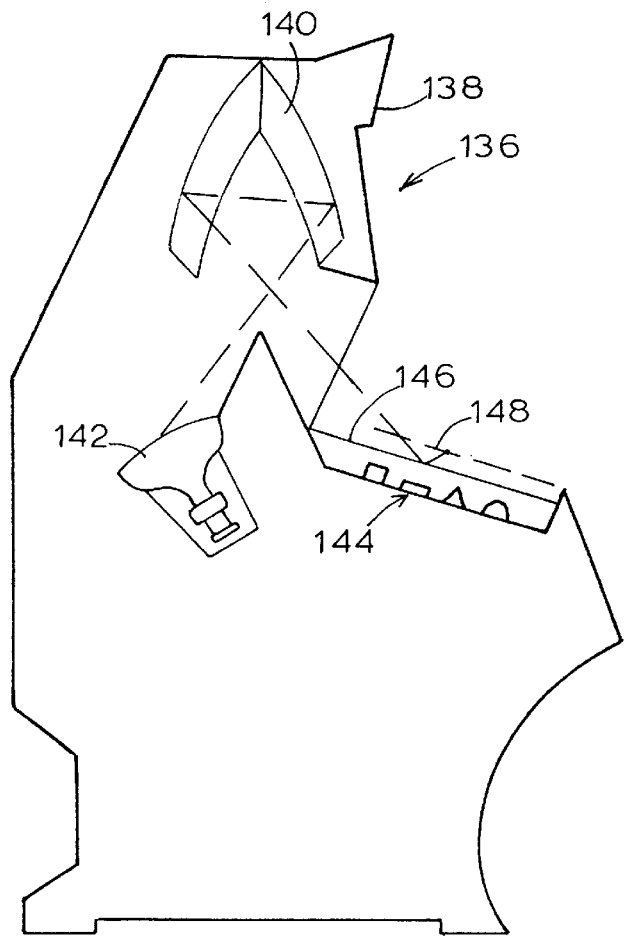
FIG. 3 illustrates schematically another embodiment of the invention which employs a dual-sector real image projector, along with a video source and a three-dimensional object display, to create compositing between the real object display and an overlying projected real image.

Turning attention now to FIG. 3, here there is shown at 136 another visual display system embodying the present invention, and including a housing 138 in which are mounted a dual-sector real image projector 140, a video source 142, a real object display 144 which takes the form of an imaginary playing field, and a plano beam splitter 146 which directly overlies this object-organized playing field.

With operation of system 136, projector 140, deriving information from video source 142, projects a foreground real image 148 which is thus visually composited with the background visual imagery or phenomena resulting from the objects in field 144. The point of view of an observer relative to the apparatus of FIG. 3 is downwardly toward image 148 and field 144.

Figure 4:
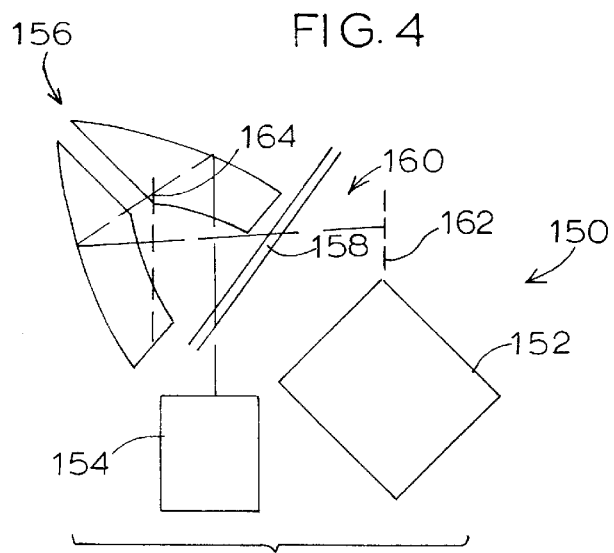
FIG. 4 illustrates another embodiment of the invention employing a dual-sector real image projector and a plano beam splitter, along with two video sources, to create a composite image including a projected real image foreground and a virtual image background.

In FIG. 4 there is shown at 150 visual display apparatus including two video sources 152, 154, a dual-sector real image projector 156 and a plano beam splitter 158.

This system, when operated, creates, in a visual staging station 160, a foreground real image 162 and a background virtual image 164. Real image 162 is derived from the display of source 154 and is projected toward the location shown by projector 156. Virtual image 164 is created by reflection from beam splitter 158 of what appears at video source 152. The point of view of an observer is laterally to the right of the apparatus shown in FIG. 4.

Figure 5:
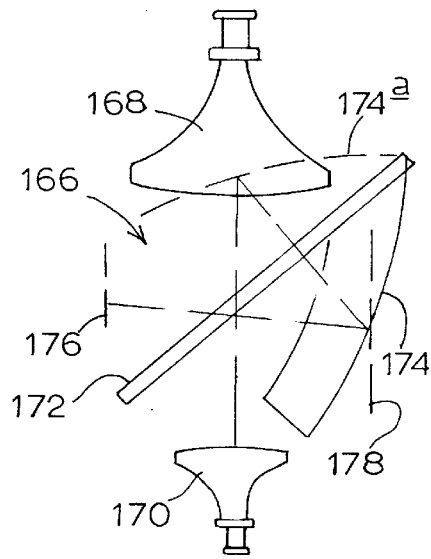
FIG. 5 shows a somewhat modified form of the invention appearing in FIG. 4—here illustrating the cooperative use of a single-sector optic portion of a real image projector along with a plano beam splitter, and two video sources, to create a composite image including a foreground projected real image and a background virtual image.

The system illustrated in FIG. 5 creates, from the point of view of a viewer (which is laterally to the left of the apparatus in FIG. 5) a multi-image composite in a visual staging station 166. This image composite organization is similar to that which is produced by the apparatus of FIG. 4, but is accomplished by a very different optical and imagery-source structural organization.

Included in the apparatus of FIG. 5 are a downwardly pointing video source 168 and an upwardly pointing video source 170.

Directly interposed these two sources, as the same are shown in FIG. 5, is a plano beam splitter 172. Also included in the system optical structure of FIG. 5 is a single-sector optical (or optic) portion 174 of a real image projector, which portion basically takes the form of one-half the structure of the previously described real image projectors. With optic portion 174 combined as shown with beam splitter 172, the two cooperate to create a virtual, confronting, reflective surface, shown at 174a, which cooperates with optic portion 174 to create an effective, whole real image projector. This very same kind of structure is fully described and explained in the referenced Welck patent.

With operation of sources 168, 170, the cooperative interaction of beam splitter 172 and optic portion 174 create a real image 176 derived from source 170. Beam splitter 172 creates a background virtual image 178 from what appears at the location of video source 168. The point of view of an observer in FIG. 5 is laterally to the left of the apparatus shown there.

Figure 6:
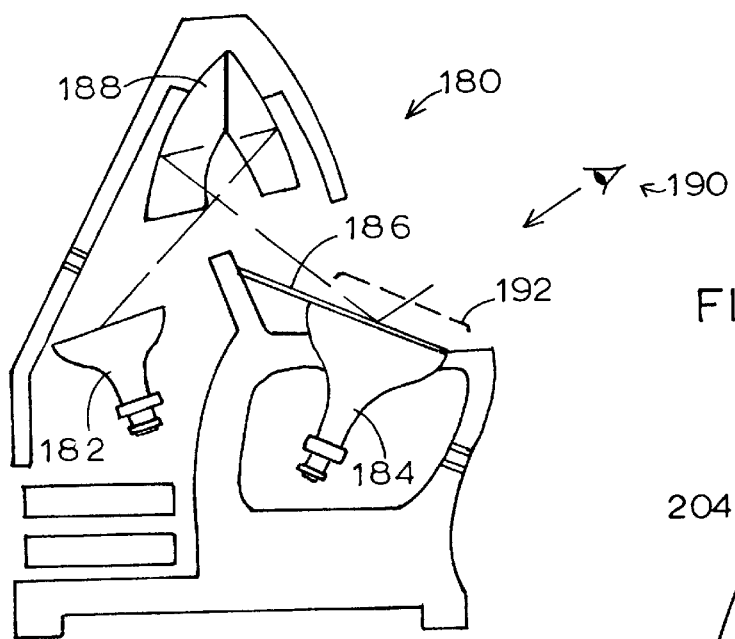
FIG. 6 illustrates another embodiment of the invention employing a dual-sector real image projector and two video sources to create a composite image including a projected real image and an underlying screen-borne image which appears on the screen of one of the two video sources.

The system of FIG. 6 is one in which a composite image is formed with a projected real image and a background screen-borne image. This apparatus, designated generally 180, includes two video sources 182, 184, a plano beam splitter 186 which substantially directly overlies the face of source 184, and a dual-sector real image projector 188.

With respect to the apparatus of FIG. 6, the point of view of an observer is indicated at 190. Through beam splitter 186, the observer is provided with a direct view of the screen-borne image created by source 184, with this view residing as a background to a real image 192 which is projected by projector 188 as derived from source 182.

Figure 7:
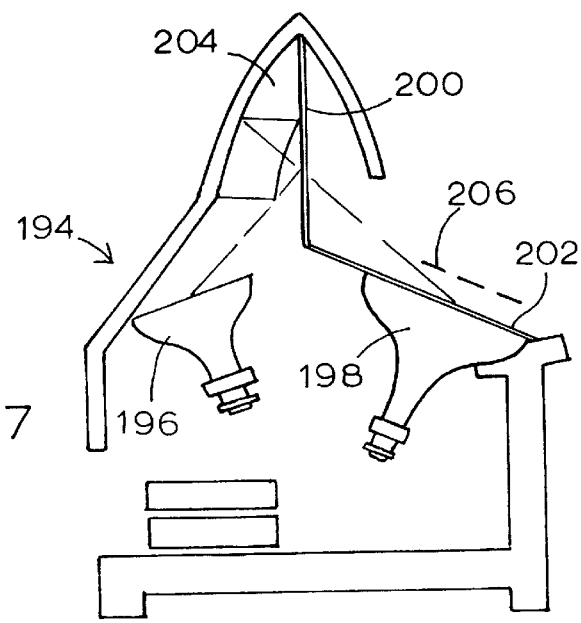
FIG. 7 depicts another invention embodiment which is somewhat similar to that illustrated in FIG. 6, except that here there is employed a single-sector optic portion of a real image projector along with a plano beam splitter to create the same kind of composite image discussed above in relation to the embodiment of FIG. 6.

The display apparatus shown in FIG. 7 is very similar in many respects to that shown in FIG. 6. This apparatus, which is designated generally 194, includes a pair of video sources 196, 198, a pair of piano beam splitters 200, 202, and a single-sector optic portion 204 of a real image projector. Sector optic 204 coacts with beam splitter 200 in the same fashion that previously mentioned optic portion 174 coacts with beam splitter 172 in the apparatus of FIG. 5. Beam splitter 202 directly overlies the face of video source 198, which source is directly viewable through this beam splitter by an observer, whose point of view is substantially the same as that illustrated in FIG. 6. Composited with this screen-borne image is a foreground real image 206 which is projected by coaction between beam splitter 200 and sector optic 204 as the same derive information from video source 196.

Figure 8:
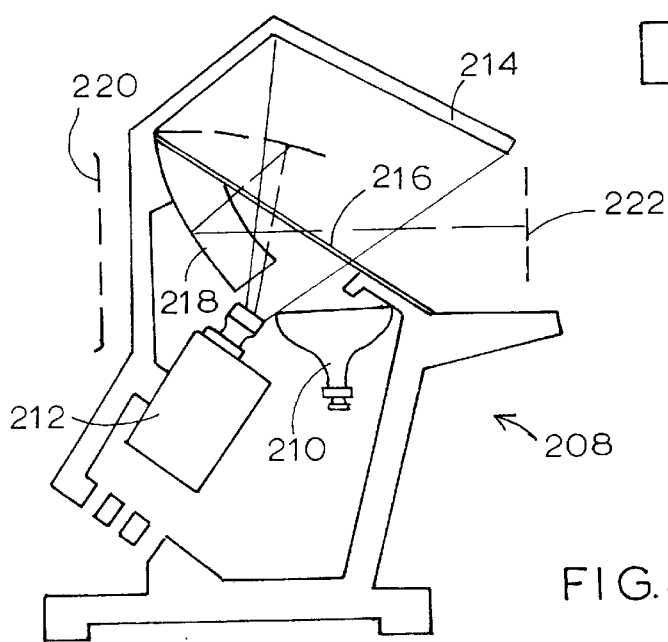
FIG. 8 illustrates another modified embodiment of the invention which is related to the embodiment shown in FIG. 2, except that it differs from that embodiment in the same structural way that the embodiment of FIG. 7 differs from the embodiment of FIG. 6. This system, as does the system of FIG. 2, creates a composite image including a foreground projected real image and a background virtual image.

Turning attention now to FIG. 8, indicated generally at 208 is a visual display apparatus including, as one imagery source, a video source 210, and as another imagery source, a projector 212 and an overhead screen 214. Further included in apparatus 208 are a piano beam splitter 216, and coacting therewith, as has previously been described, a single-sector optic portion 218 of a real image projector.

With operation of display apparatus 208, the image which is projected by projector 212 onto screen 214 results in a background virtual image 220 (relative to the point of view of an observer which is laterally immediately to the right of the apparatus in FIG. 8). Cooperation of beam splitter 216 with sector optic 218 results in the projection of a foreground real image 222.

Figure 9:
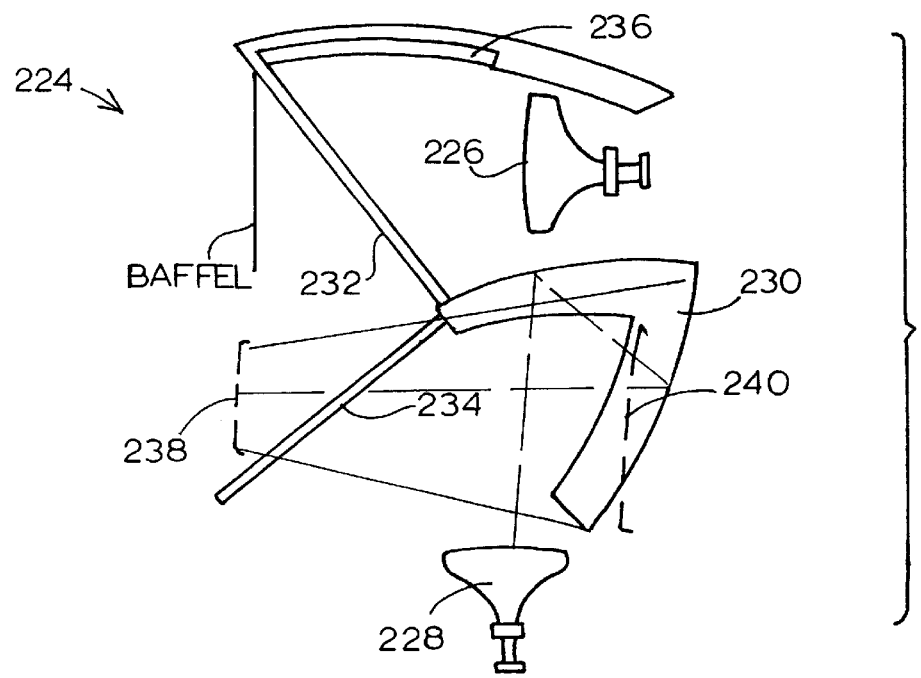
FIG. 9 displays another embodiment of the invention which employs a dual-sector real image projector, a spherical mirror, and a pair of plano beam splitters to create a composite image which includes a foreground projected real image and a background expanded/collimated virtual image.

In FIG. 9 there is shown at 224 yet another apparatus embodiment of the invention. Apparatus 224 includes two video sources 226, 228, a dual-sector real image projector 230, two substantially right-angularly disposed piano beam splitters 232, 234, and a spherical mirror 236. The point of view of an observer in FIG. 9 is immediately to the left of the apparatus shown in this figure.

From that point of view, projector 230 creates a projected foreground real image 238 derived from video source 228, and coaction between beam splitters 232,234 and mirror 236 creates a background, composited, expanded/collimated virtual image 240 derived from video source 226.

Figure 10:
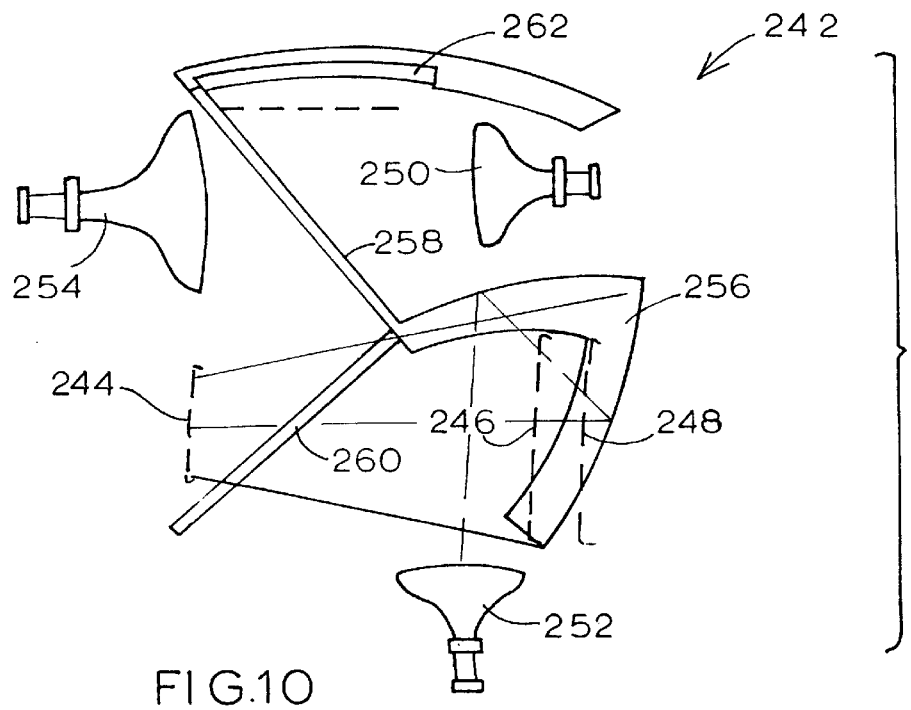
FIG. 10 shows an embodiment of the invention which is somewhat similar to that drawn in FIG. 9—here including a dual-sector real image projector, a spherical mirror, and a pair of plano beam splitters, along with three video sources, to create a composite image including a foreground projected real image, and two, front-to-rear-separated, background virtual images, including an expanded/collimated virtual image.

Display apparatus 242 shown in FIG. 10 is similar in many ways to the apparatus shown in FIG. 9, except that it includes three sources of imagery, and produces for an observer, whose point-of-view position is laterally to the left of the apparatus of FIG. 10, a multi-planar composite image including a foreground real image 244, and two, depth-offset, background, virtual images 246, 248. Image 248 is expanded/collimated.

Thus, included in apparatus 242 are video sources 250, 252, 254, a dual-sector real image projector 256, a pair of piano beam splitters 258, 260 and a spherical mirror 262.

With operation of apparatus 242, the composite of images 244, 246, 248 comes about as follows. Mirror 262 coacts with beam splitters 258, 260 to create the furthest background virtual image 248, derived from video source 250. The two beam splitters coact with imagery at the location of source 254 to create the intermediate background virtual image 246. Projector 256 derives information from video source 252 to create foreground real image 244.

Figure 11:
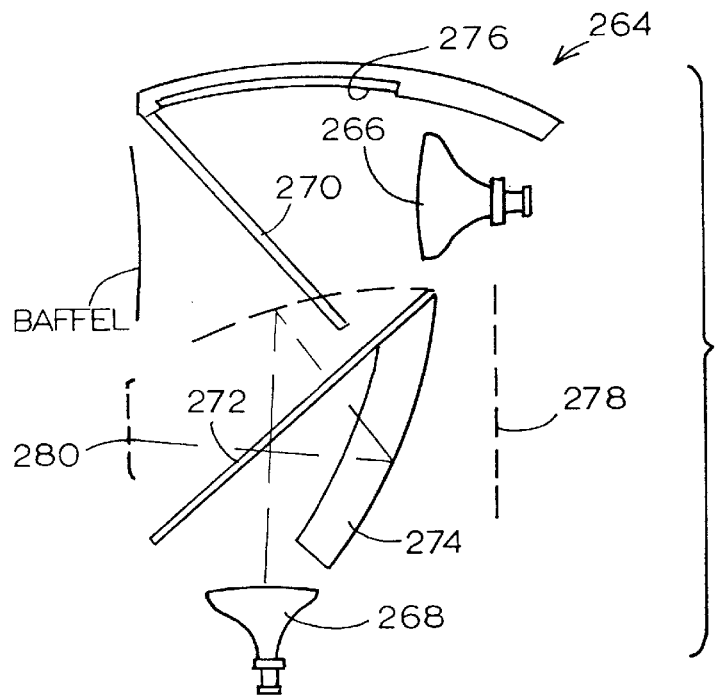
FIG. 11 illustrates another embodiment of the invention which can be thought of as a modification of the embodiment shown in FIG. 9, differing in respect of the fact that it employs but one single-sector optic portion of a real image projector structure combined with a plano beam splitter, and with the overall system creating a composite image including a foreground projected real image and a background expanded/collimated virtual image.

FIG. 11 shows at 264 an embodiment of display apparatus which includes two video sources 266, 268, two plano beam splitters 270, 272, a single-sector optic portion of a real image projector 274 which coacts with beam splitter 272, and a spherical mirror 276.

With operation of the apparatus of FIG. 11, and from the point of view of an observer whose observation point is immediately to the left of the apparatus in FIG. 11, there is created, in the same kind of visual staging station previously mentioned, a composited multiple-image display including a background expanded/collimated virtual image 278, and a projected foreground real image 280. Coaction between beam splitter 272 and sector optic 274 projects, from information derived from video source 268, real image 280. The two beam splitters, in cooperation with spherical mirror 276, create virtual image 278 from source material derived from video source 266.

Figure 12:
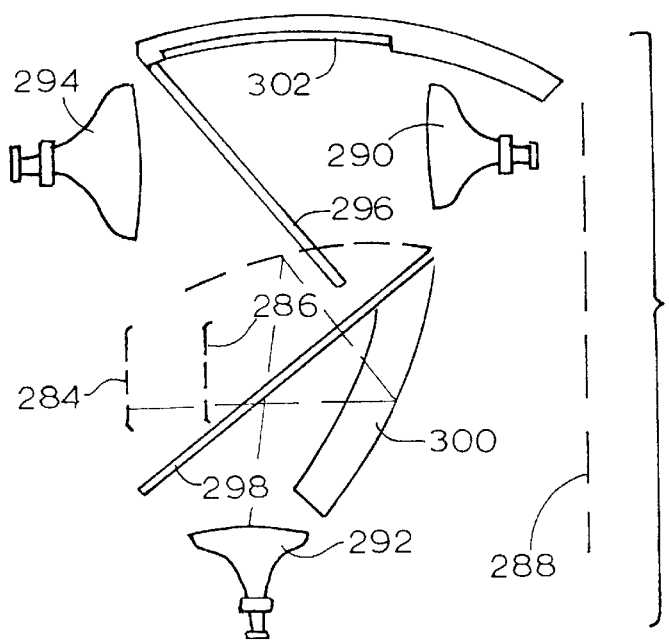
FIG. 12 illustrates yet another embodiment of the system of the invention, which can be thought of as a modification of the embodiment shown in FIG. 10, with this modification differing from the structure in FIG. 10 in the same manner that the structure illustrated in FIG. 11 differs from the structure shown in FIG. 9, and with the further difference that the system organization of FIG. 12 creates a composite image including two front-to-rear-relatively-displaced, projected real images against a background virtual image.

At 282 in FIG. 12 there is shown yet another embodiment of the present invention, with this embodiment having some strong structural similarity to the embodiment shown in FIG. 11. Structurally, the FIG. 12 embodiment differs from the FIG. 11 embodiment by the presence of a third video source. Functionally, and from the point of view of a viewer, which is to the left of the apparatus shown in FIG. 12, a three-level composite image results, which composite includes an outer foreground real image 284, an intermediate foreground real image 286, and an background virtual image 288.

The three video sources contained the apparatus of FIG. 12 are shown at 290, 292, 294. Cooperating with these three video sources are two plano beam splitters 296, 298, a single-sector optic portion 300 of a real image projector, which portion coacts with beam splitter 298, and a spherical mirror 302.

Beam splitter 298 and sector optic 300, deriving imagery from video source 292, create outer foreground projected real image 284. Cooperative action between the two beam splitters and spherical mirror, deriving information from video source 290, create background virtual image 288. Cooperative interaction between the two beam splitters and video source 294 results in intermediate foreground projected real image 286.

Figure 13:
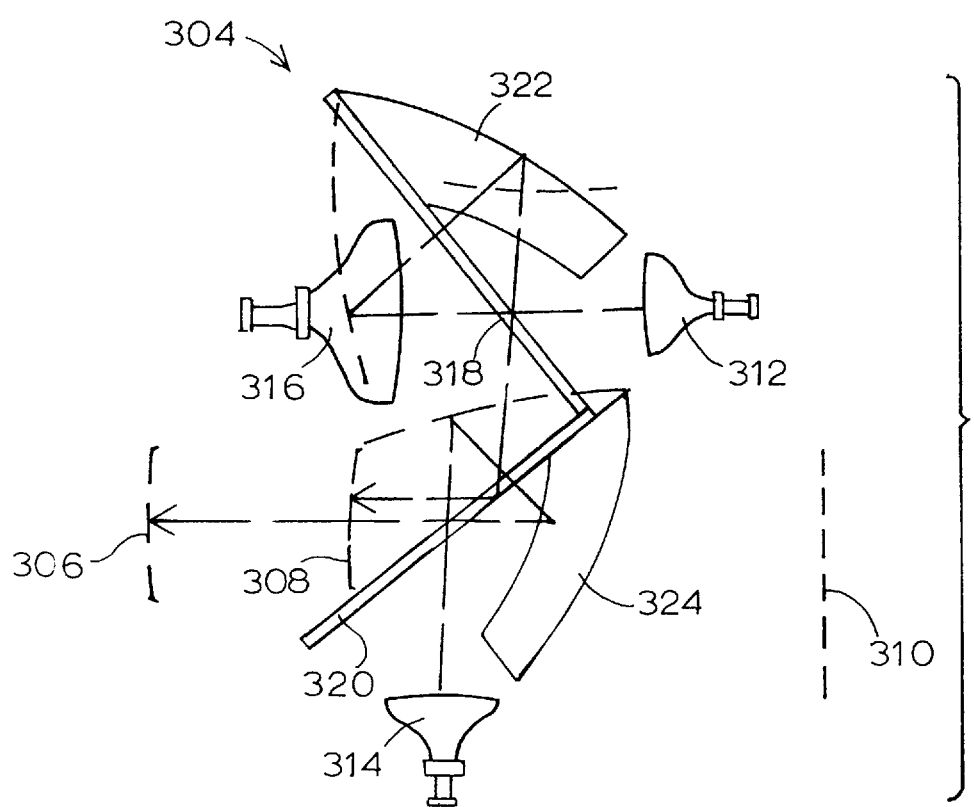
FIG. 13 shows a modified embodiment of the system which creates a composite image organization like that created by the system illustrated in FIG. 12, with the system of FIG. 13 including a pair of single-sector optic portions of a real image projector, each combined with a respective plano beam splitter, along with three video sources.

Addressing attention now to FIG. 13, here there is shown generally at 304 still another embodiment of visual display apparatus constructed in accordance with the present invention. The point of view of an observer relative to the apparatus of FIG. 13 is immediately to the left of this apparatus. The composite image which results from operation of apparatus 304 is very much like that created by operation of the apparatus of FIG. 12. Thus this composite image includes, from the point of view of an observer as just mentioned, an outer foreground real image 306, an intermediate foreground real image 308, and a background virtual image 310.

Included in apparatus 304 are three video sources 312, 314, 316, two piano beam splitters disposed as shown at 318, 320, and two single-sector optic portions 322, 324 of a real image projector, which portions cooperate, respectively, directly with beam splitters 318, 320.

With video source 314 providing the relevant source information, beam splitter 320 coacts with sector optic 324 to create outermost foreground projected real image 306. Deriving information from video source 312, sector optic 322 cooperating with the two beam splitters, create intermediate foreground projected real image 308. Interactive cooperation between the two beam splitters, which derive information from video source 316, creates background virtual image 310.

Figure 14:
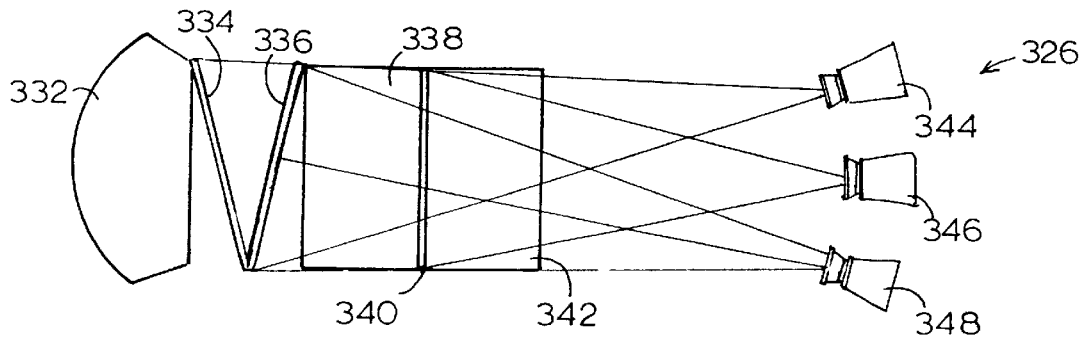
FIGS. 14 and 15 are directly related schematic drawings of one form of a theater-environment system constructed in accordance with the invention, with FIG. 14 illustrating a plan view, and FIG. 15 illustrating a section/side elevation. The system of FIGS. 14 and 15 includes three projection sources along with three additional video sources, in combination with a cascaded interleaving organization including two plano beam splitters, three screen/scrim structures (image-forming surface structures), and a dual-sector real image projector, to create a composite image which, in addition to a projected real image, can include up to five other distributed images.
Figure 15:
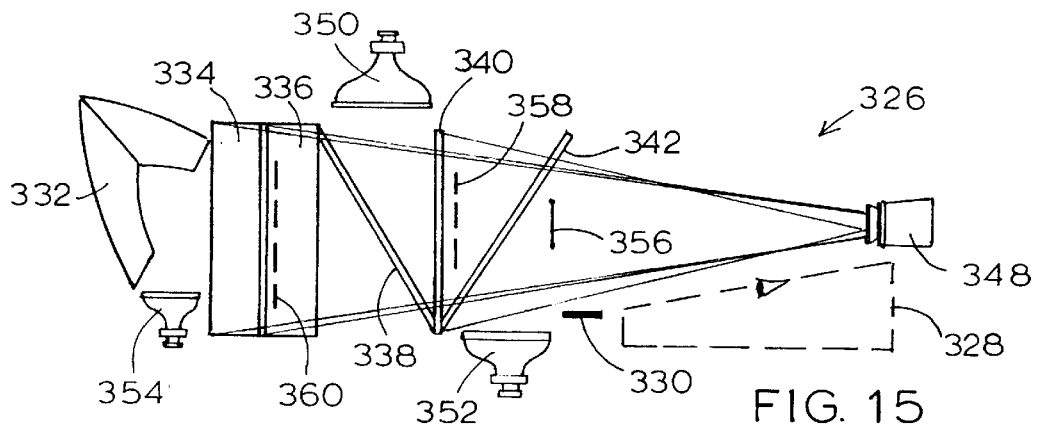

Looking now at FIGS. 14 and 15 together, here there is shown generally at 326 a theater-like system which is constructed in accordance with yet another important embodiment of our invention. FIG. 14 represents an overhead plan schematic view of this system, and FIG. 15 shows, schematically, a cross section/side elevation of the system. Focusing for just a moment on FIG. 15, indicated generally at 328 is what is referred to herein as an audience envelope—a space where members of an audience can be seated or otherwise placed for viewing (toward the left in FIGS. 14 and 15) composite imagery created by the structure in system 326. Still with momentary reference to FIG. 15 alone, shown at 330, in front of the audience envelope, is a stage which can support, if desired, three-dimensional objects, including live action.

Progressing from left-to-right generally through FIGS. 14 and 15, and focusing attention on the constituents of system 326, these include a dual-sector real image projector 332, a pair of screen/scrim structures 334, 336, a plano beam splitter 338, another screen/scrim structure 340, another plano beam splitter 342, and somewhat above and slightly behind, or at least toward the rear of, the audience envelope, three projectors 344, 346, 348 (see particularly FIG. 14). These projectors are for projecting images, as for example derived from slides, film, etc. Also included in the organization of system 326 are three video sources 350, 352, 354 (see particularly FIG. 15) with video source 350 pointing downwardly just rearwardly (relative to the audience envelope) of screen/scrim structure 340, with source 352 pointing upwardly immediately beneath beam splitter 342, and with source 354 pointing upwardly beneath projector 332. The screen/scrim structures in system 326, as do the plano beam splitters, permit visual transmission through them. In addition, they act as image-forming surface structures which respect to projections, as will be described, from projectors 344, 346, 348.

Operation of system 326 permits very complex compositing of multiple images, including a real image, in up to six layers, so-to-speak, of visual information. More specifically, projection from projector 344 forms an audience-viewable image on the viewing side of screen/scrim structure 334. Similarly, projection from projector 346 forms a viewable image on screen/scrim structure 340. Projection from projector 348 forms a surface-viewable image on the viewing side of screen/scrim structure 336.

Imagery derived from video source 354 is projected by projector 332 to form a foreground projected real image 356. Imagery derived from video source 352, through the optical action of beam splitter 342, creates a virtual image 358. Beam splitter 338 creates, as derived from video source 350, a virtual image 360.

Thus, the system shown and described in and with respect to FIGS. 14 and 15 offers the possibility of compositing a quite deep and complex composite of multiple images, all of which can be combined (composited) with the appearance of solid objects, including live action, on stage 330. In the region of system 326 which lies between projector 332 and projectors 344, 346, 348, the structural components of the system can be viewed as a cascaded, interleaved organization, including at least one beam splitter interposed a pair of image-forming surface structures (screen/scrim structures), and at least one image-forming surface structure interposed a pair of beam splitters.

Figure 16:
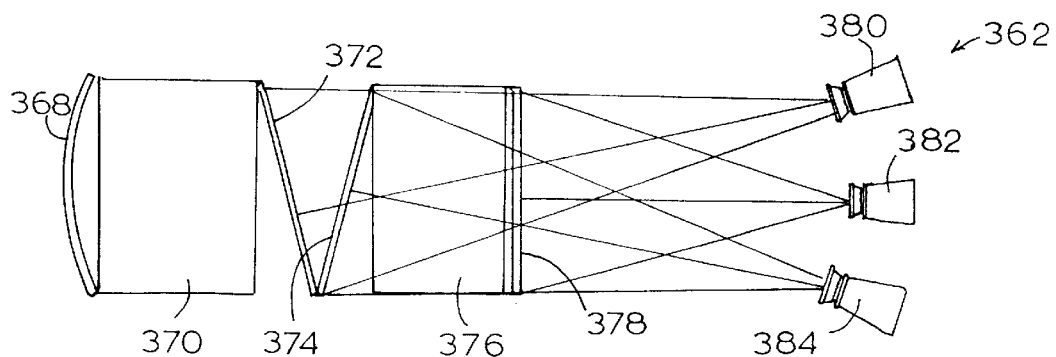
FIGS. 16 and 17 are related to one another, and show another form of a theater-environment system constructed in accordance with the invention, which system also uses herein three projection sources along with three additional video sources, and a somewhat different arrangement of cascaded interleaved beam splitters and screen/scrim structures, along with a spherical mirror, to create another kind of multi-layered composite image somewhat like that creatable by the system illustrated in FIGS. 14 and 15.
Figure 17:
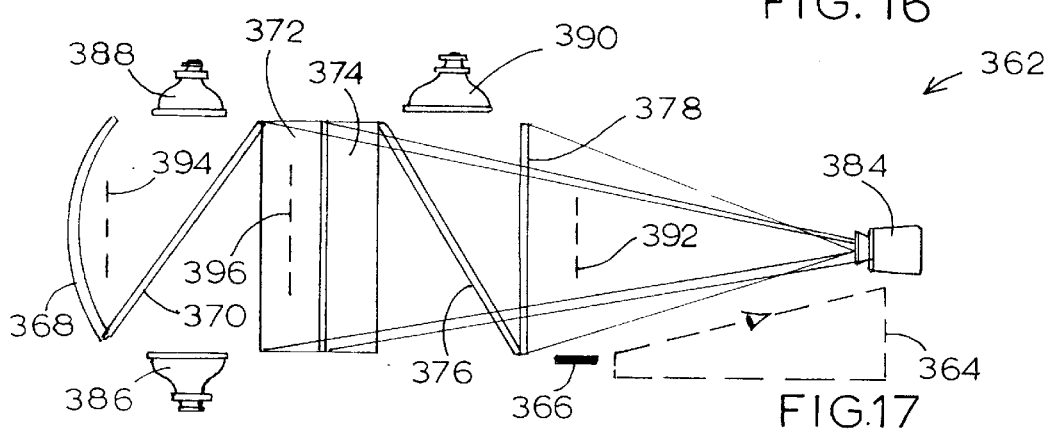

FIGS. 16 and 17 illustrate at 362 another theater-like organization constructed in accordance with the features of the present invention. FIG. 16 provides a schematic top plan view of the system, and FIG. 17 a cross-sectional/side-elevational view of the same. Pictured in FIG. 17 are an audience envelope 364 which is like previously mentioned audience envelope 328, and a stage 366 which is like previously mentioned stage 330.

Progressing generally from left-to-right in FIGS. 16 and 17, through the various components which form system 362, included are a spherical mirror 368, a plano beam splitter 370, a pair of screen/scrim structures 372, 374, another plano beam splitter 376, and yet one more screen/scrim structure 378. Disposed slightly above and toward the rear of the audience envelope are three projectors 380, 382, 384 (see particularly FIG. 16) which are like previously mentioned projectors 344, 346,348, respectively. Also included in system 362 are three video sources 386, 388, 390 (see particularly FIG. 17). Source 386 points upwardly at the underside of beam splitter 370, and source 388 points downwardly at the upper surface of this very same beam splitter. Video source 390 points downwardly at the upper surface of beam splitter 376.

System 362, like previously described system 326, permits the deep-volume compositing of a mix of up to six images, including a projected real image. Projections from projectors 380, 382, 384 result in audience-viewable surface-formed images on the viewing sides of screen/scrim structures 372, 378, 374, respectively. Coaction of spherical mirror 368 and adjacent beam splitter 370 derives imagery from video source 388 to create a foreground projected real image 392. The undersurface of beam splitter 370 coacts with source 386 to create a background virtual image 394. The upper surface of beam splitter 376 cooperates with video source 390 to create an intermediate virtual image 396.

As is true in the case of previously described system 326, imagery produced in system 362 can be composited with three-dimensional real objects and live action on stage 366.

Figure 18:
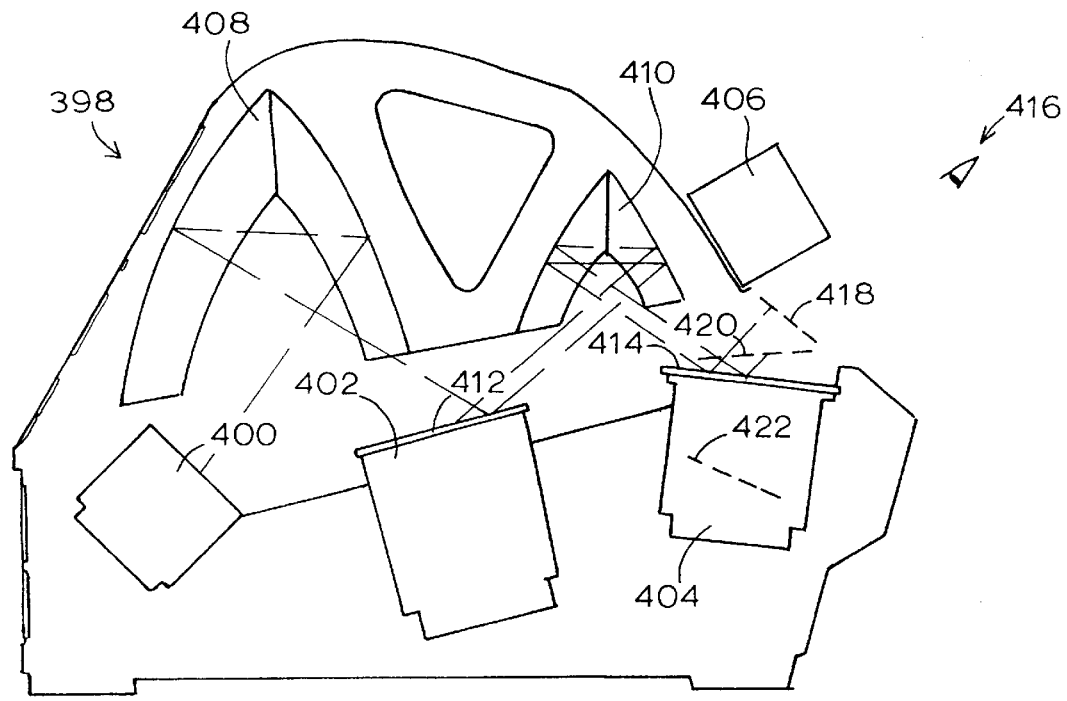
FIG. 18 illustrates still another embodiment of the system of the present invention, which embodiment includes four video sources, along with two, dual-sector, real image projectors, and a piano beam splitter, to create a composite image including a pair of projected real images, a screen-borne image beneath the two real images, and a virtual image beneath all of the other images.

Indicated at 398 in FIG. 18 is yet another embodiment of the present invention. This embodiment includes four video sources 400, 402, 404, 406, two dual-sector real image projectors 408, 410, and two plano beam splitters 412, 414 which directly overly the image forming surfaces of sources 402, 404, respectively.

With operation of the apparatus of FIG. 18, and from the point of view of an observer which is shown at 416, the two real image projectors and the two beam splitters coact with imagery derived from source 400 to create a near foreground projected real image 418. The two beam splitters and real image projector 410 coact to create an intermediate foreground projected real image 420. Immediately beneath image 420, beam splitter 414 allows direct viewing of the surface-screen-formed image appearing from video source 404. Cooperation between beam splitter 414 and video source 406 results in a background virtual image 422.

Figure 19:
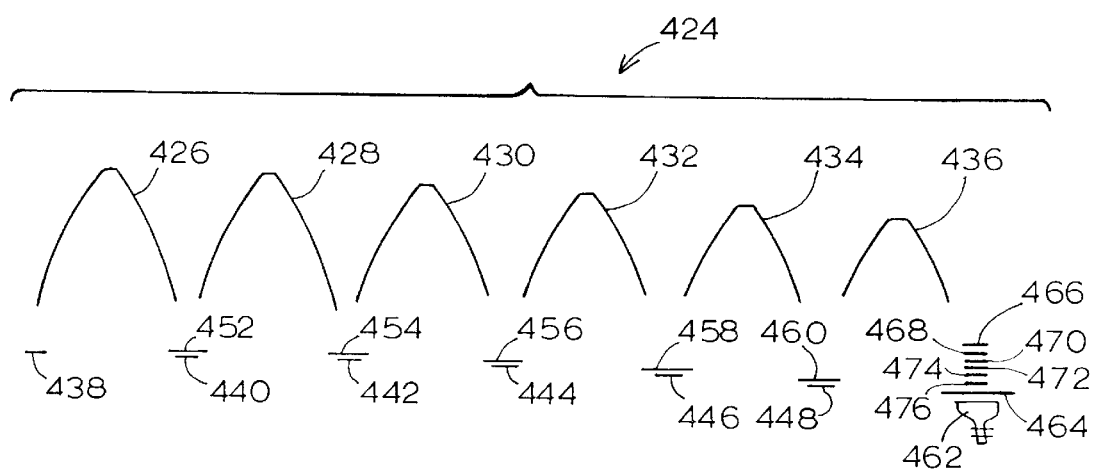
FIG. 19 illustrates yet a further embodiment of the invention, here taking the form of a distributed array of dual-sector, real image projectors and plano beam splitters, organized with an object source for each projector, and with one, additional video source, with this embodiment enabling the creation of a composite stack of real images, one for each of the sources, overlying and thus composited with a screen-borne viewable image generated by the video source.

FIG. 19 illustrates what might be thought of as a distributed array form of the present invention, and is shown here, generally at 424, include an array of six dual-sector real image projectors 426, 428, 430, 432, 434, 436, six inanimate visual sources, such as solid objects, 438, 440, 442, 444, 446, 448, and five plano beam splitters 452, 454, 456, 458, 460 which overlie, respectively, objects 440, 442, 444, 446, 448. Also included, toward the right side of the organization shown in FIG. 19, are a video source 462 and a plano beam splitter 464 directly overlying the screen in this source.

The chosen point of view for an observer in the system of FIG. 19, is downwardly adjacent the right end of the array in the figure. Here, what is seen is a vertical composite of seven images which appear in a stack. Progressing downwardly through this stack, at 466, 468, 470, 472, 474 and 476 are real projected images derived from sources 438, 440, 442, 444, 446, 448, respectively. Composited beneath this "stack" is the directly viewable, screen-formed image appearing on the surface (screen) of video source 462.

Figure 20:
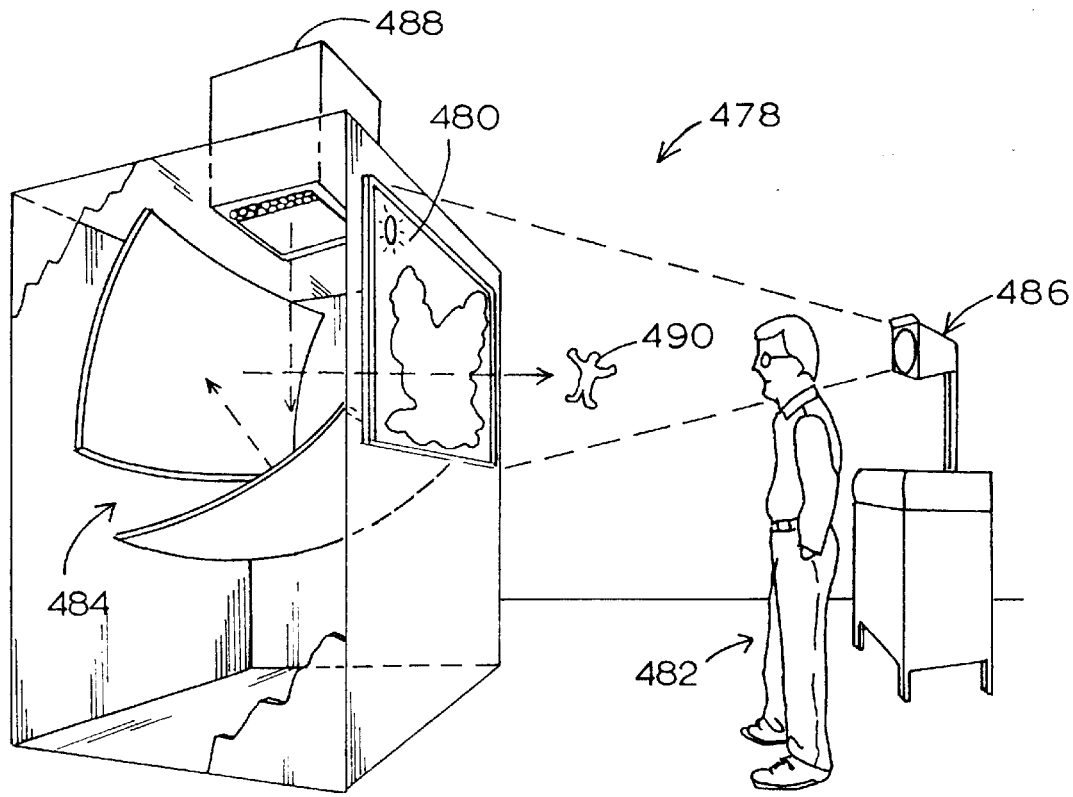
FIG. 20 illustrates still another embodiment of the invention which includes a dual-sector, real image projector disposed on one side of a screen/scrim structure, and a pair of sources including a video source and a projector, all cooperating to create a composite image including a foreground projected real image (projected through the screen/scrim structure) displayed against a background image projected onto the "viewing", image-forming side of the screen/scrim structure.

FIG. 20 illustrates at 478 apparatus constructed in accordance with the invention which includes a screen/scrim structure 480, on the rear side of which (from the point of view of an observer shown at 482) is a dual-sector real image projector 484. On the viewing side of structure 480 is a projector 486 which acts as a source for the projection of a static, or a moving, image onto this viewing side. Real image projector 484 coacts with a video source, for example that shown at 488, to create a foreground projected real image 490 which is thus composited with the background, surface-formed image appearing on the viewing surface of structure 480 (as derived from projection by projector 486).

Figure 21:
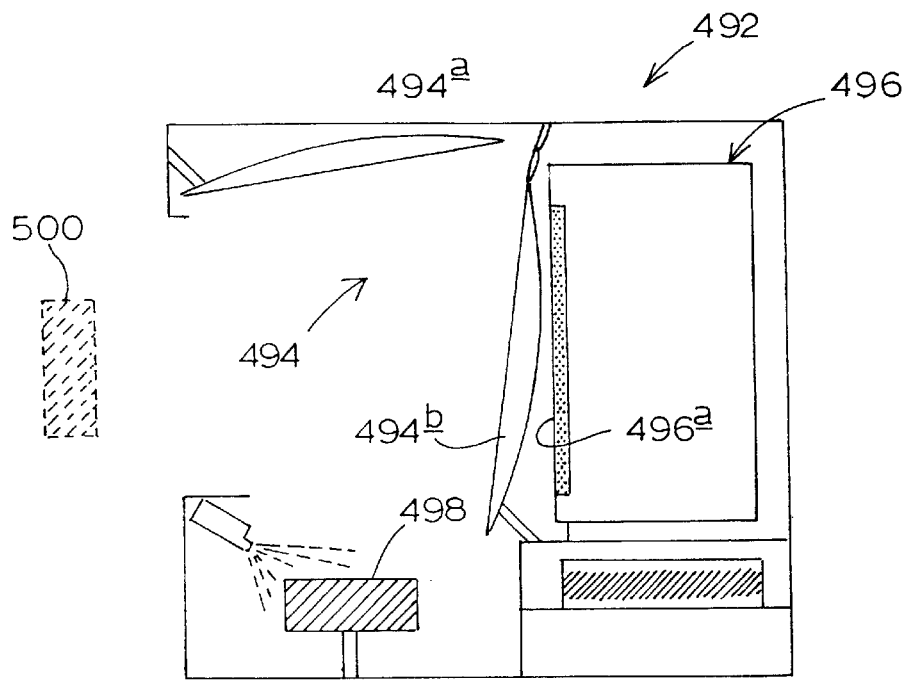
FIG. 21 shows another embodiment of the invention which includes a dual-element, spherical-component, real image projector, and behind one of the elements in the projector, which element is at least partially transmissive to light, a video source which presents a screen-borne image. All of this cooperating structure creates a composite image including a foreground projected real image displayed against a background screen-borne image, which screen-borne image is thus viewable through one of the optical elements in the real image projector which is effective to create the projected real image.

In FIG. 21, there is shown generally at 492 yet another embodiment of the present invention. This embodiment includes a dual-section, spherical-component, real image projector 494 which includes optically confronting reflective components 494a, 494b. The point of view of an observer is to the left of the apparatus pictured in FIG. 21. Relative to this point of view, disposed behind component 494b, which component is partially transmissive to light, there is a video source 496. At 498 in apparatus 492 is a visual source which takes the form of a real object.

With operation of the system/apparatus of FIG. 21, real image projector 494 projects a foreground real image 500. This real image is composited against a background, screen-borne image which appears at the surface (screen) 496a of source 496, as transmitted through projector component 494b.

Figure 22:
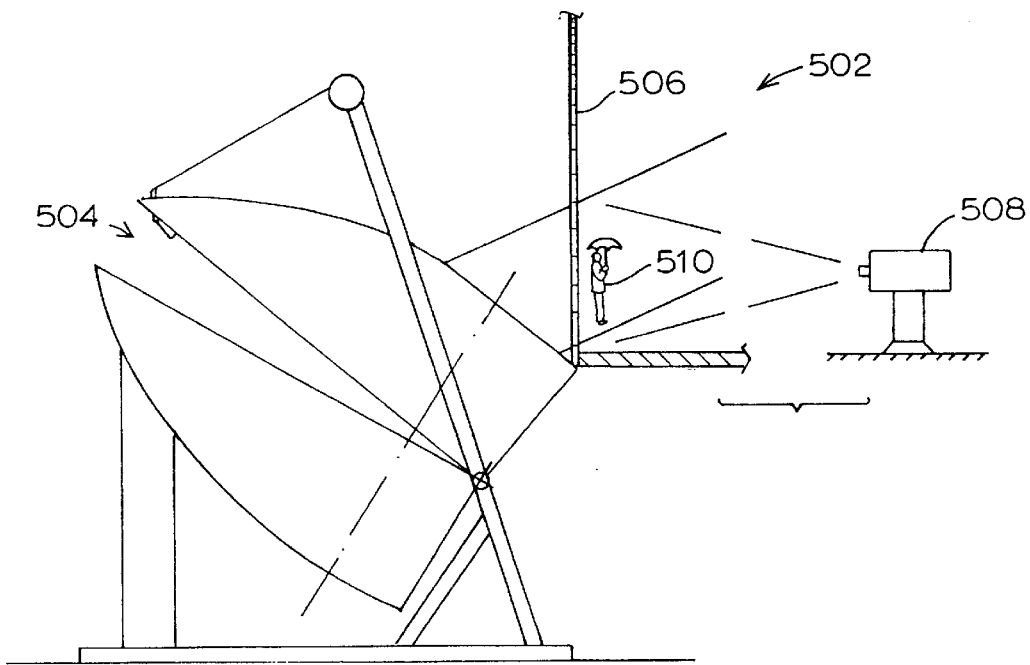
FIG. 22 illustrates still another modification of the invention which is somewhat similar in its organization to that illustrated in FIG. 20, with the structure of FIG. 22 including a dual-sector real image projector, a scrim/screen structure through which a real image is projected, and a projector for projecting and creating a screen-borne image on the "viewing" side of the screen/scrim structure. This embodiment results in the production of a composite image including a foreground projected real image displayed against a background projected-onto-screen (or screen-borne) image.

FIG. 22 illustrates another important form of the invention, here shown generally at 502, with apparatus 502 including and articulated (adjustable), dual-sector real image projector 504, a scrim/screen structure 506, and a projector 508 usable to project static or moving images onto the image-forming surface of structure 506. This image-forming surface faces to the right in FIG. 22. With operation of this system, projector 504 creates, from a suitable visual image source, a foreground projected real image 510 which is composited against a background, surface-formed image resulting from projection from projector 508.

Figure 23:
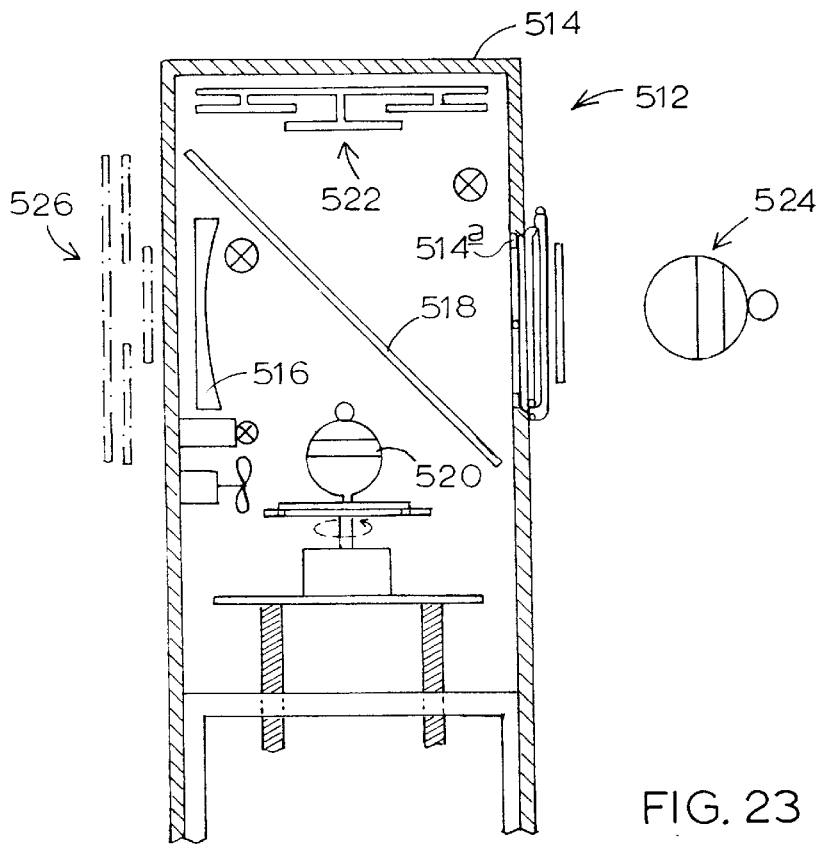
FIG. 23 illustrates another form of the invention which includes a real-image projector in the form of a single-element spherical mirror, and a cooperating plano beam splitter, both of which work together to create a composite image including a foreground-projected real image and a background virtual image.

In FIG. 23, at 512 there is shown still another organization which embodies the key features of the present invention. Within a housing 514 there are disposed a spherical mirror 516, a plano beam splitter 518, and two visual imagery sources, including a three-dimensional object 520, and an array 522 of two-dimensional images.

With operation of the system of FIG. 23, mirror 516 coacts with plano beam splitter 518 to create at 524, and through a viewport 514a in housing 514, a foreground projected real image. The piano beam splitter forms at 526 a background, composited virtual image derived from array 522.

Figure 24:
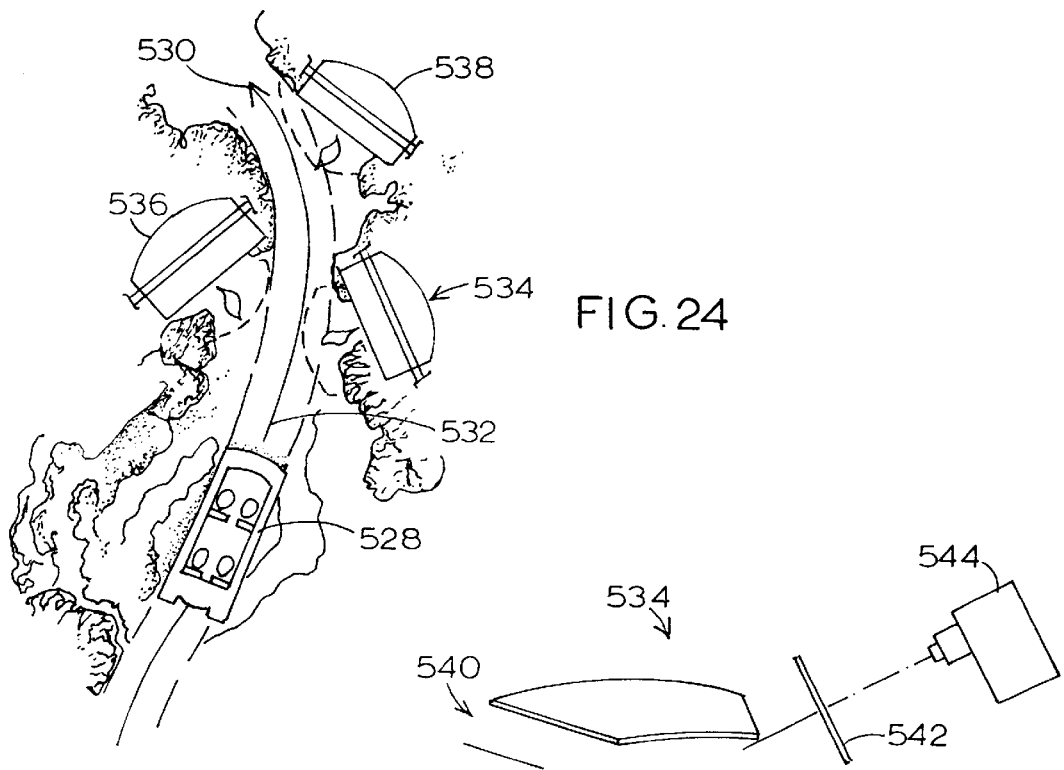
FIG. 24 illustrates a fragmentary plan view of an amusement system characterized by an amusement ride having, distributed along its ride path, several (three in the drawing) image-compositing systems constructed, for example, in accordance with any one of the embodiments specifically illustrated in other drawing figures herein.
Figure 25:
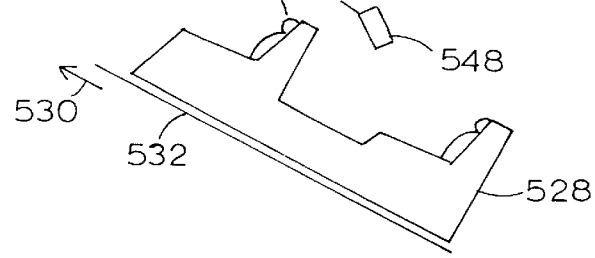
FIG. 25 is a view which relates to FIG. 24, and shows, in side schematic form, viewers in an amusement ridecar approaching one of the image-compositing systems depicted in FIG. 24, with the particular kind of compositing system which is shown in FIG. 25 including a dual-sector, real image projector which projects, as derived from a rear-projection screen, a foreground real image through a screen/scrim structure, onto which structure is projected a screen-borne image derived from a projector disposed on the "viewing" side of the screen/scrim structure.

Focusing attention now on FIGS. 24 and 25 together, and beginning with FIG. 24, here there is shown an amusement-ride system application and embodiment of the present invention. Thus, shown in FIG. 24 is a ridecar, or ride vehicle, 528, which travels generally in the direction of arrow 530 along a ride path 532, to transport riding viewers past the three visual staging stations presented, according to the present invention, by each of three visual display units 534, 536, 538. These display units may be constructed in accordance with any one of the specific system embodiments which have been described hereinbefore.

FIG. 25 illustrates one of these display units, such as display unit 534, as including a dual-sector real image projector 540, a rear projection screen 542 and a rear projector 544 as a source of visual imagery, a screen/scrim structure 546, and a viewing-side-of-structure-546 projector 548.

With operation of the system depicted in FIG. 25, riders transported by ride vehicle 528 past the image viewing station presented by this system see a multi-image composite which includes a foreground projected real image 550, derived from rear-projection screen 542, displayed against a background, screen-borne image resulting from projection by projector 548 onto the viewing side of structure 546. If desired, the system could be operated in such a fashion that projector 548 is not at all times turned on, whereupon viewers transported past the system now being described would see a composite image which includes projected real image 550 against the background image of the screen/scrim structure per se.

Figure 26:
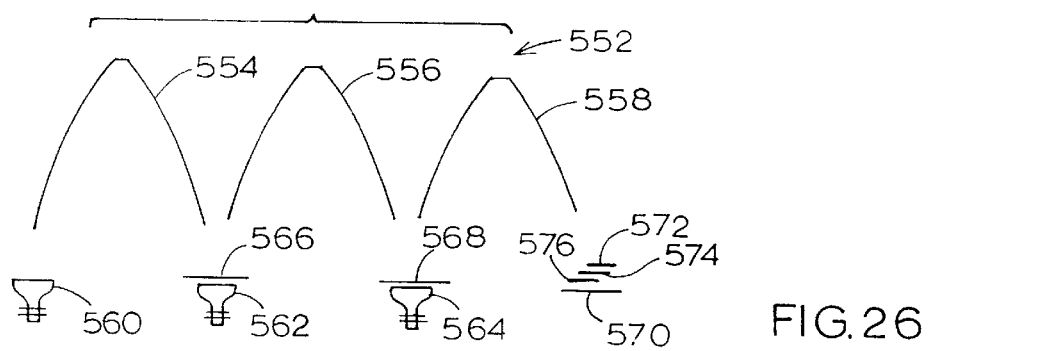
FIG. 26 is a view of a system very much like that which is illustrated in FIG. 19, but differing in the fact that here what is shown is a system for greatly enhancing the resolution of a video image provided simultaneously on each of three spaced video monitors, with there resulting from this arrangement a composite, approximately single-layer projected real image which is formed by effective staggering of the images drawn specifically from each of the three video sources to enhance greatly the resulting image resolution. For the purpose of clarity in this figure, the three components of the resulting projected real image are actually shown in a significantly out-of-single-plane manner in order to clarify understanding of what is occurring in the operation of this system.

Turning attention now to FIG. 26, here there is shown generally at 552 another distributed-array form of the present invention including three dual-sector real image projectors 554, 556, 558, three video sources 560, 562, 564 and three plano beam splitters 566, 568, 570. Beam splitters 566, 568 directly overlie the screens of video sources 562, 564, respectively, and beam splitter 570 is disposed in approximately the same relationship to projector 558 in FIG. 26 as is previously mentioned beam splitter 464 located relative to projector 436 in the structure of FIG. 19.

With operation of system 552, each of the three video sources is supplied with exactly the same video information. These three sources, and the projecting optics associated therewith, are so positioned that a resulting projected composite real image lies immediately above beam splitter 570 approximately in a single plane, but with the three compositing constituent images slightly staggered in that plane relative to one another in such a manner that the pixels, raster lines, or the like in these images "fill in" spaces to achieve significantly higher image resolution than that which characterizes any single one of the images that appears on the faces of the three video sources. This composite real image includes three image components 572, 574, 576 which derive, respectively, from video sources 560, 562, 564, respectively.

In order to make the "story" of the operation of system 552 clear, the resultant projected composite real image is shown with each of the three image components just mentioned displaced vertically relative to one another (i.e. significantly out-of-plane), and laterally staggered in an exaggerated manner. The staggering which is utilized occurs, from the point of view of a viewer of FIG. 26, in a plane which extends generally from the left to the right in the figure, and normal to the plane of FIG. 26.

Such a system as system 552 can, of course, be utilized to enhance resolution using any appropriate number of projected images, two or more.

Figure 27:
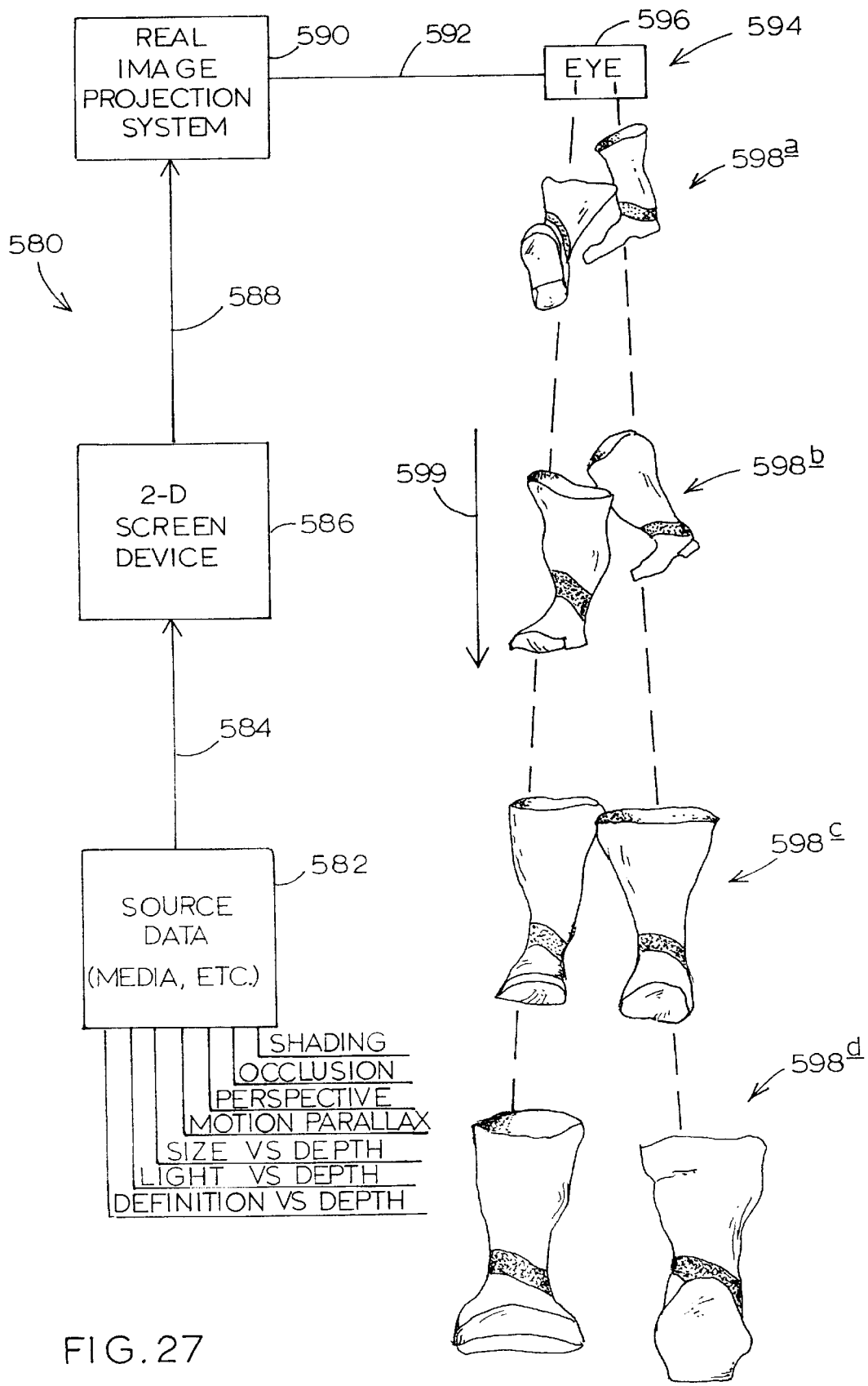
FIG. 27 is a schematic/block view of a modified form of the system wherein an aerially suspended three-dimensional-appearing image is projected as a real image based upon visual source data which includes any one or more of a variety of psychologically motivating three-dimensional image cues.

Shifting focus now to FIG. 27 in the drawings, here there is depicted schematically at 580 a very exciting system modification of the invention which can be employed, with or without multi-image compositing, and which is based on the concept of supplying image data for the projection of an aerially suspended real image, where that data includes one or more psychologically motivating three-dimensional image cues. In other words, the source data, which might take the form of a film, a videotape, a video laser disc, a magnetic image-containing disc, an optical data stream, an electronic data stream, or other, has built into it one or more of these cues which results in the creation of imagery that strongly suggests to a viewer that he or she is actually looking at a real three-dimensional, i.e., real volume-occupying, image. According to this system, these data cues are selected from a group of well-known cues, such as that group consisting of shading, occlusion, perspective, motion parallax, size vs. depth, light (or chroma value) vs. depth, and definition vs. depth. Such source data is illustrated in block form at 582 in FIG. 27.

Software which is available, for example, to create such image cues in a digital-type database includes products which are sold under the names Flame, Flint, Soft Image, Electric Image, Swivel 3-D, Spectra Vision, Elastic Reality, and Cluster After Effects.

Image-generating information from source data 582 is furnished, as indicated by arrow 584, in any suitable fashion to a two-dimensional (2-D) screen device (visual image source), such as a video monitor 586, which produces, from the supplied image-promoting data stream, a two-dimensional image characterized by the presence of psychologically-perceived motivating cues that strongly suggest to a viewer that he or she is looking at a real, volume-occupying, three-dimensional image.

Progressing further through the system illustrated at 580, monitor 586 acts as a visual source, as indicated by arrow 588, for a real-image projection system 590 (or real-image projecting optics) which can take the form of any known type of real-image projection system, including any one of the imaging systems described hereinabove. As illustrated schematically by arrow 592, system 590 projects into a visual staging station 594 a projected real image derived, via rays emanating from screen device 586, from source data 582. In block form at 596 there is shown a viewer's eye which, in station 594, perceives a startling, realistic, three-dimensional-appearing, unencumbered, projected real image which, because of the presence of one or more of the source-data three-dimensional image cues, is perceived absolutely to be a real, volume-occupying, three-dimensional image.

It is the important combined presence of source-data three-dimensional cues, and the ultimate aerial suspension of an unencumbered image, characterized by the selected cues, that presents a stunning, unencumbered, believable three-dimensional image, which actually is an image that lies more nearly in a somewhat dimensionless (from a thickness point of view) plane in space.

Further describing what is illustrated in FIG. 27, an example here is pictured where the viewer's eye(s) perceives in station 594 a pair of turning and moving boots which change orientations and which appear to walk toward and to approach the viewer. Four stages in the progress of forward (toward the viewer) motion of these boots is illustrated at 598a, 598b, 598c and 598d. Arrow 599 schematically illustrates a progression in time as the boots appear to approach the viewer. The apparent three-dimensional imagery of these boots is infused with the kind of perceptually motivating three-dimensional cues mentioned earlier embedded in the generating source-data stream, and causing the viewer, in the specific illustration given, to see moving imagery characterized by shading, occlusion, perspective, motion parallax, size vs. depth, chroma value (light) vs. depth and definition vs. depth cues. From the vantage point of the viewer, system 580 presents an unencumbered, projected real image which unquestionably appears to occupy three-dimensional space, even though that imagery is actually derived from data based upon two dimensions.

Suspended Image Interaction

Figure 28:
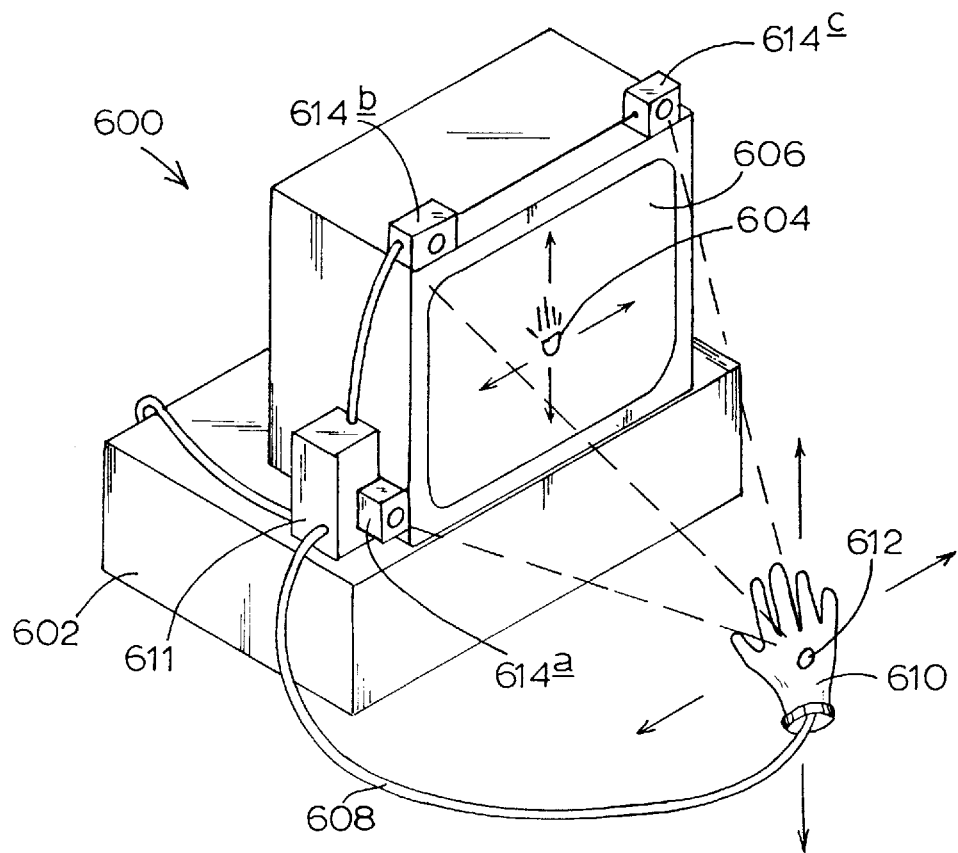
FIG. 28 is a perspective schematic view illustrating a system allowing viewer/user interaction with an image in a setting whereby the user employs a trackable, worn glove in a region adjacent the location of the image.

An important extension of the real-image producing systems of the present invention relates to the capability of allowing a viewer to interact with a suspended or apparently floating real image. A large body of published information enables one skilled in the art to produce a system in which a user can manipulate (for example, through a data glove which includes a sensor) or experience travel within an image displayed on a two-dimensional computer display screen. For example, see the following U.S. Pat.: No. 4,988,981, No. 4,937,444, No. 5,097,252 and No. 4,542,291, each of which is incorporated here by reference (collectively referred to as the "Zimmerman patents"). The Zimmerman patents as well as many other publications and products currently on the market generally relate to a technology known as "virtual reality". FIG. 28 shows a basic virtual reality system 600 which is disclosed in Zimmerman's '981 patent. The system 600 utilizes a computer 602 to generate an image on a two-dimensional or semi-flat display screen 606. A cable 608 connects a data glove 610 to interface electronics 611 which is connected to computer 602. A signal generator, for example, an ultrasonic transducer 612 is attached to glove 610. Ultrasonic receivers 614a, 614b and 614c are positioned around display screen 606 and are connected to interface electronics 611. Signal data is collected relating to the position of ultrasonic transducer 17 and the degree of bending and/or direction of pointing, of one or more of the user's fingers in glove 610. Computer 602 then affects changes in displayed image 604 corresponding to the movement of data glove 610, i.e., the user's hand.

Figure 29:
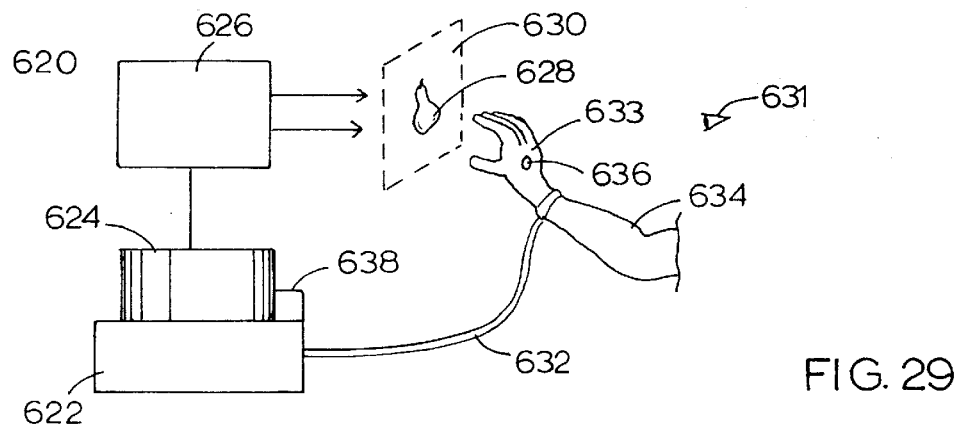
FIG. 29 is a schematic view of a system, somewhat like that illustrated in FIG. 28, wherein a user, wearing a trackable glove interacts with a projected real image, such as the image of a pear.

The present invention enables a very important and powerful extension of virtual reality technology by providing techniques for suspending a real image with which a viewer may interact. FIG. 29 schematically illustrates such a system. Interactive suspended image system 620 includes a computer 622 which is capable of generating an image on two-dimensional display screen 624. Computer 622 and display screen 624 are collectively referred to as an image source. Real image producing optics (real image derivation/presentation structure) 626, for example, such as the optics shown in U.S. Pat. No. 4,802,750, is positioned to receive an image from display screen 624, and to form and project a corresponding real image 628 in a staging area 630 in front a viewer's eye 631. A cord 632 connects computer 622 to data glove 633 which is worn on a user's hand at the end of arm 634. Data glove 633 may also have a signal generator such as ultrasonic transducer 636 which sends signals to an ultrasonic receiver 638.

Figure 30:
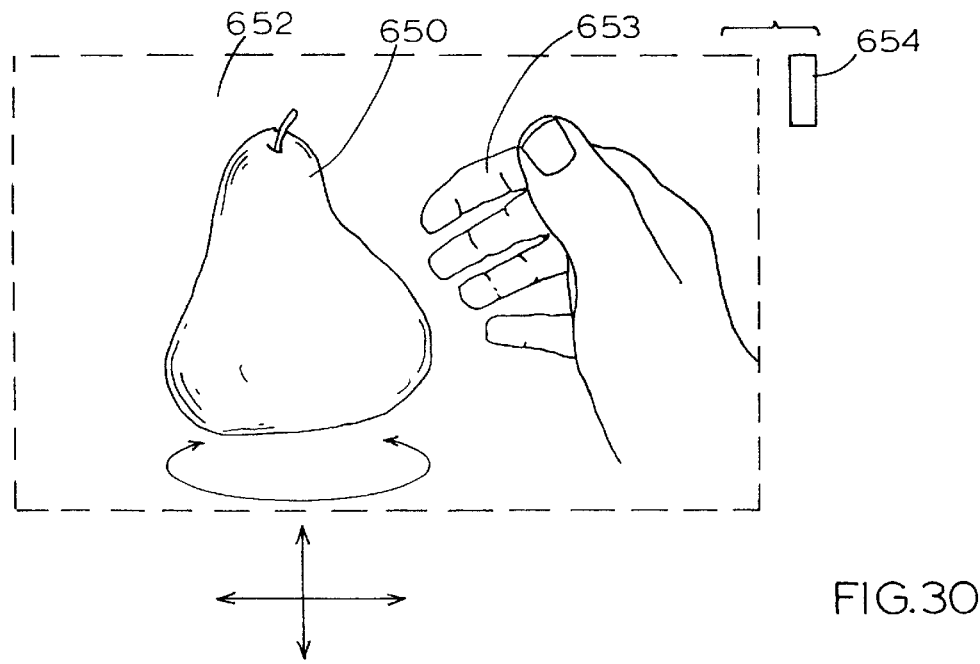
FIG. 30 is a schematic view of a system, somewhat like that depicted in FIG. 29, wherein a user, without the employment of a trackable glove, can interact directly, as for example by grasping, a projected real image to manipulate the orientation, position, etc. of the same.

In the system illustrated in FIG. 29, interaction data is produced through sensors and signal generators such as the ones disclosed in the Zimmerman patents. There are, however, other ways to facilitate interaction between a user and a suspended image without a data glove. For example, in FIG. 30, a real image of a pear 650 is projected in staging area 652. The user achieves interaction with the pear by moving a portion of hand 652 in the staging area. A light emission and detection device 654, such as one of the ones disclosed in U.S. Pat. No. 5,248,856 (scanning laser system) generates signals indicative of finger location. The signals are transmitted to a signal processor which then affects the desired movement or alteration of pear 650.

Figure 31:
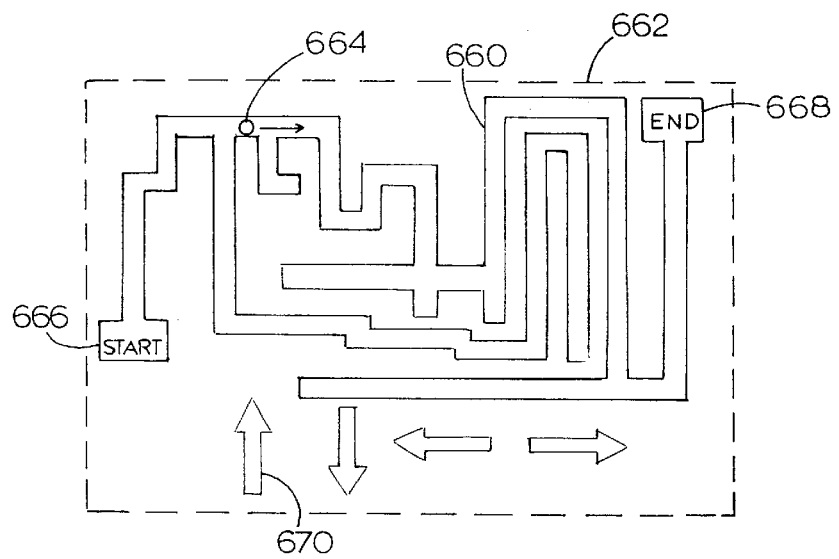
FIG. 31 is a schematic illustration of the projected real image of, for example, a board game, with respect to which a user is permitted to interact in a fashion moving, as indicated by vertical and horizontal arrows in the figure, a player, piece, etc., which forms part of the game.

As shown in FIG. 31, the present invention may also take the form of a game played on a suspended screen, i.e., a real image of a screen. Maze 660 is suspended in staging area 662. A player cursor 664 is movable through maze 660. The user attempts to advance cursor 664 from start 666 to end 668. The user is able to direct advancement of cursor 664 by touching or penetrating suspended real image arrows 670. The position of the user's finger may be detected, for example, by scanning lasers, as employed in the system disclosed in U.S. Pat. No. 5,248,856. In some cases it may also be useful for the user to attach rings, reflectors, light or sound emitters, etc. to the fingers in order to facilitate the interactive process. Additionally, it is also possible to employ a sound detecting mechanism to allow the user to interact with a suspended image by local commands. A system such as the one used to produce the game illustrated in FIG. 31 could also project a real image of a screen and a keyboard analogous to a conventional computer screen and keyboard.

From the foregoing, it should be quite apparent and evident how the system and methodology of the present invention open the "important doors" referred to above for the creation of exciting, visually striking and commanding, volume-occupying composited and other images, including at least one projected real image. The potential applications and fields of use are nearly as wide as the creative imagination. The numerous embodiments disclosed and discussed herein show and suggest the various many ways in which optical elements and visual sources can be combined, according to the invention, to achieve the kind of compositing on which this invention centers. We know, therefore, that other specific arrangements of such components, well within the scope of this invention, will come to the minds of those skilled in the relevant art.

It is desired and claimed to secure by Letters Patent:

1. A visual display apparatus comprising a visual staging station defining a space for viewing images from a vantage point along a viewing axis, a beam splitter located along the viewing axis in said space, the beam splitter having a front side partially facing the vantage point, and a back side opposite from the front side, wherein the beam splitter is oriented obliquely relative to the viewing axis, a first image source equipped and positioned to display a first image directed toward the front side of the beam splitter so that, to a person viewing the staging station from the vantage point, the first image appears to be a background image located behind the beam splitter substantially along the viewing axis, a second image source equipped and positioned to display a second image directed along the path leading toward and through the backside of the beam splitter along the viewing axis toward the vantage point, and an optical structure located along the path between the second image source and the beam splitter, wherein the optical structure causes divergent rays from the second image to converge substantially along the viewing axis in front of the beam splitter, so that, to a person viewing the staging station from the vantage point, the second image appears as a floating real image in front of both the beam splitter and the background image.

2. The display apparatus of claim 1, wherein the optical structure includes at least one curved mirror.

3. The display apparatus of claim 1, wherein the optical structure includes plural mirrors.

4. The display apparatus of claim 1, wherein the optical structure includes at least one parabolic mirror.

5. The display apparatus of claim 1, wherein the beam splitter forms about a 45-degree angle relative to the viewing axis.

6. The display apparatus of claim 1, wherein the first image source faces in a direction substantially perpendicular to the viewing axis.

7. The display apparatus of claim 1, wherein the optical structure includes an element which is at least partially light transmissive.

8. The display apparatus of claim 1 further comprising a housing for substantially encasing the image sources and optical structure.

9. The display apparatus of claim 1, wherein the second image source is provided with a data stream containing three-dimensional image cues selected from the group consisting of shading, occlusion, perspective, motion parallax, size versus depth, light versus depth and definition versus depth, and combinations thereof, so that the floating real image in front of the beam splitter appears to be three-dimensional from the vantage point along the viewing axis.

10. The display apparatus of claim 1 further comprising a control mechanism which allows a viewer to interact with the floating real image in front of the beam splitter.

* * * * *